US010353050B2

(12) United States Patent
Nakatani et al.

(10) Patent No.: US 10,353,050 B2
(45) Date of Patent: Jul. 16, 2019

(54) RADAR APPARATUS, METHOD FOR INSPECTING AXIS DEVIATION THEREOF, AND COMPUTER-READABLE RECORDING MEDIUM WITH PROGRAM RECORDED THEREON

(71) Applicant: DENSO CORPORATION, Kariya, Aichi-pref. (JP)

(72) Inventors: Hiroto Nakatani, Kariya (JP); Koji Shimizu, Kariya (JP); Chiharu Yamano, Tokyo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 765 days.

(21) Appl. No.: 14/895,460

(22) PCT Filed: Jun. 3, 2014

(86) PCT No.: PCT/JP2014/064769
§ 371 (c)(1),
(2) Date: Dec. 2, 2015

(87) PCT Pub. No.: WO2014/196541
PCT Pub. Date: Dec. 11, 2014

(65) Prior Publication Data
US 2016/0124076 A1      May 5, 2016

(30) Foreign Application Priority Data

Jun. 3, 2013   (JP) .................................. 2013-117234
May 16, 2014  (JP) .................................. 2014-102313

(51) Int. Cl.
*G01S 7/40*      (2006.01)
*G01S 13/34*     (2006.01)
*G01S 13/93*     (2006.01)

(52) U.S. Cl.
CPC ............ *G01S 7/4026* (2013.01); *G01S 13/34* (2013.01); *G01S 13/931* (2013.01); *G01S 2007/4034* (2013.01); *G01S 2013/9375* (2013.01)

(58) Field of Classification Search
CPC ...................................................... G01S 7/4026
(Continued)

(56) References Cited

U.S. PATENT DOCUMENTS 6,026,353 A * 2/2000 Winner .................. G01S 7/4026
                                                                   342/70
6,714,156 B1 * 3/2004 Ibrahim ................ G01S 7/4026
                                                                  342/165

(Continued)

FOREIGN PATENT DOCUMENTS

EP     2549289       1/2013
JP     2001-021646 A 1/2001
(Continued)

OTHER PUBLICATIONS

International Preliminary Report on Patentability; International Application No. PCT/JP2014/064769; Filed: Jun. 3, 2014 (with English translation).
(Continued)

*Primary Examiner* — Marcus E Windrich
(74) *Attorney, Agent, or Firm* — Knobbe, Martens, Olson & Bear, LLP

(57) ABSTRACT

A radar apparatus generates a spectrum distribution where frequencies in a beat signal are associated with intensities of respective frequency components. Based on a plurality of spectrum distributions generated over a predetermined number of measurement cycles prescribed in advance, the radar apparatus generates a reflection intensity distribution where frequencies are associated with road surface reflection inten- (Continued)

sities of the radar wave from a road surface at each frequency. In the reflection intensity distribution, the radar apparatus detects an intensity peak indicating a frequency that maximizes the road surface reflection intensity. Based on the detected intensity peak, the radar apparatus determines at least whether or not the radar apparatus is in an axis deviation state that is taken as a state where a reference axis of the radar apparatus has an inclination of not less than a prescribed angle in a vehicle height direction relative to a horizontal axis prescribed to a vehicle.

13 Claims, 11 Drawing Sheets

(58) Field of Classification Search
USPC .......................................................... 342/174
See application file for complete search history.

(56) References Cited

U.S. PATENT DOCUMENTS

| | | | | |
|---|---|---|---|---|
| 6,896,082 B2* | 5/2005 | Asanuma | ............ | G01S 7/4026 180/169 |
| 7,079,073 B2* | 7/2006 | Fujita | ................... | G01S 7/4026 342/165 |
| 9,527,509 B2* | 12/2016 | Kwon | ................... | G01S 7/4026 |
| 2005/0116854 A1* | 6/2005 | Beez | ..................... | G01S 7/4026 342/70 |
| 2006/0176214 A1* | 8/2006 | Nakagawa | ............ | G01S 7/4026 342/174 |
| 2010/0182199 A1* | 7/2010 | Jeong | ................... | G01S 7/4026 342/374 |
| 2012/0229364 A1 | 9/2012 | Nakabayashi et al. | | |
| 2012/0235851 A1* | 9/2012 | Park | ..................... | G01S 7/4026 342/70 |

FOREIGN PATENT DOCUMENTS

| | | |
|---|---|---|
| JP | 2003-035768 A | 2/2003 |
| JP | 2003-057345 A | 2/2003 |
| JP | 2008-203147 A | 9/2008 |
| JP | 2011-002346 A | 1/2011 |
| JP | 2011-217360 A | 10/2011 |
| JP | 2012-194169 A | 10/2012 |
| WO | 2014/196541 A1 | 12/2014 |

OTHER PUBLICATIONS

International Search Report (translated version); International Application No. PCT/JP2014/064769, filed Jun. 3, 2014; 10 pages.

* cited by examiner

FIG.6
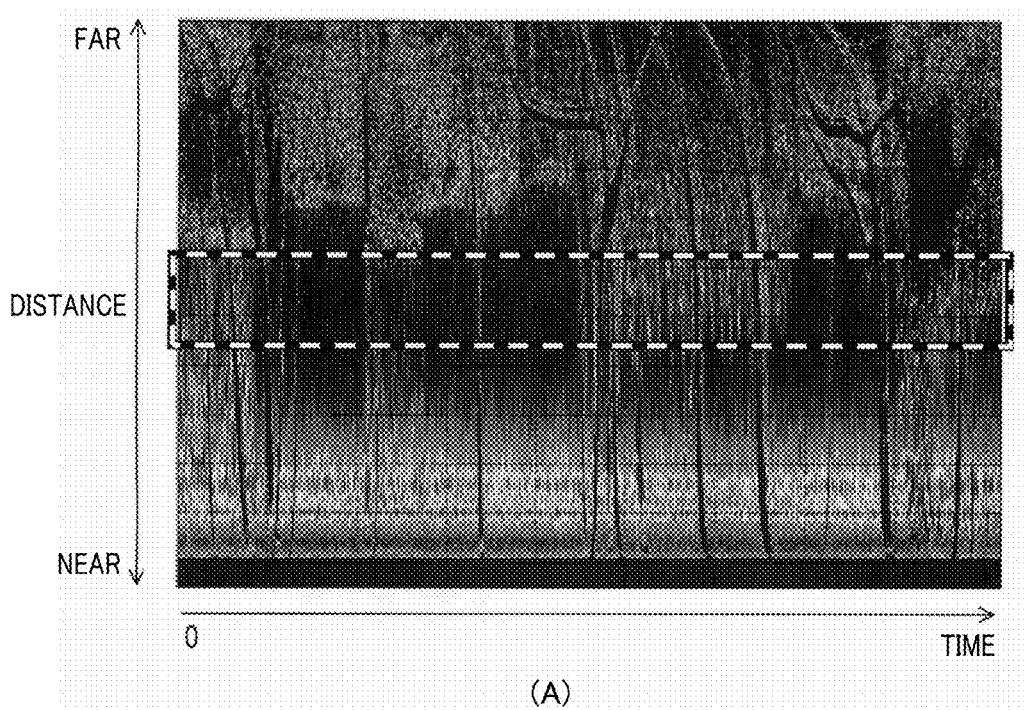
(A)
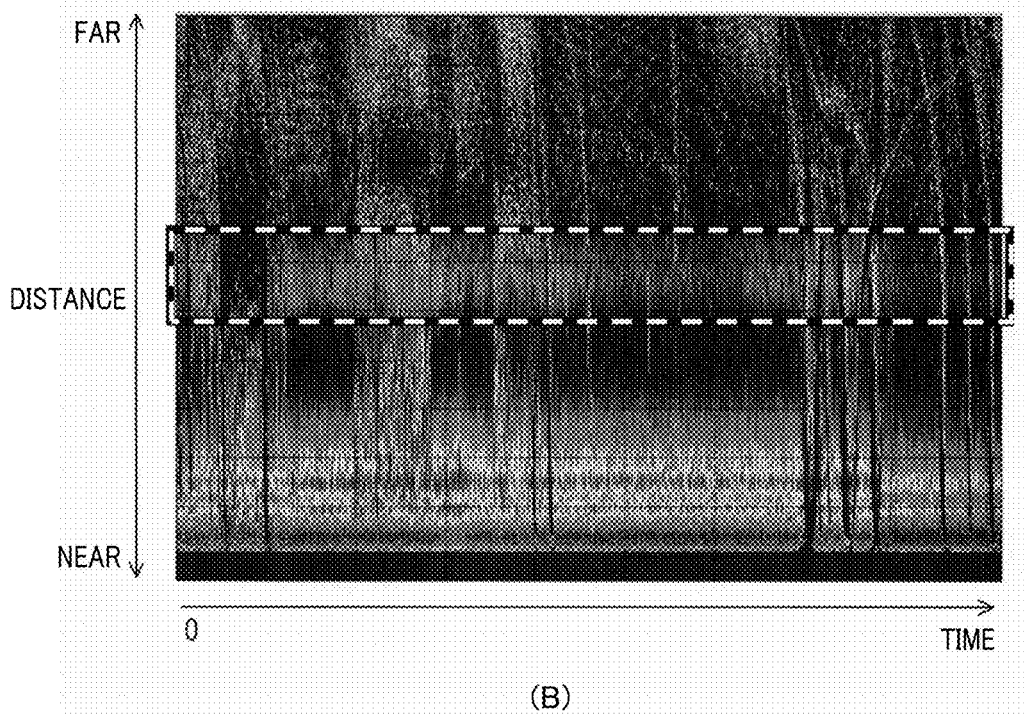
(B)

FIG.7
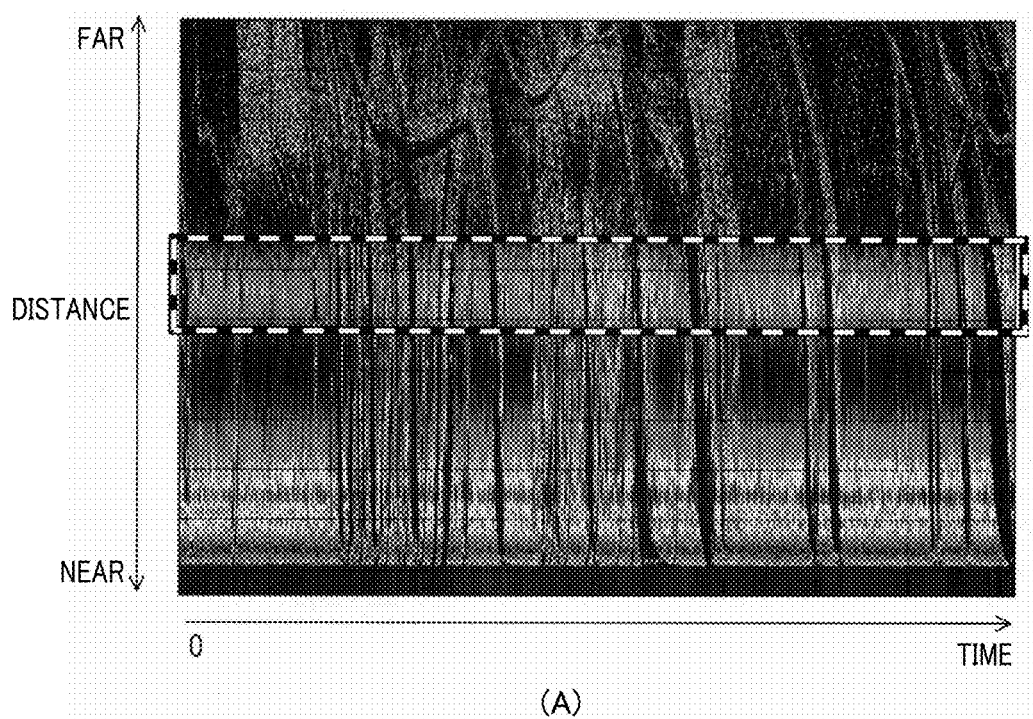
(A)
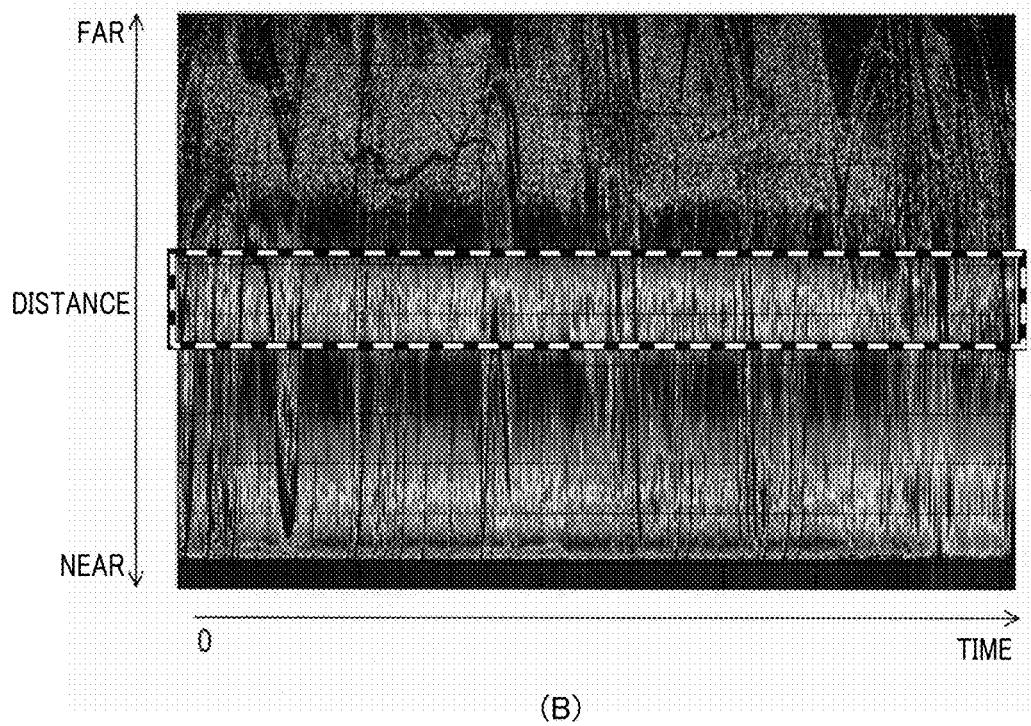
(B)

RADAR APPARATUS, METHOD FOR INSPECTING AXIS DEVIATION THEREOF, AND COMPUTER-READABLE RECORDING MEDIUM WITH PROGRAM RECORDED THEREON

CROSS-REFERENCE TO RELATED APPLICATION

This application is a U.S. National Phase application under 35 U.S.C. 371 of International Application No. PCT/JP2014/064769 filed on Jun. 3, 2014 and published in Japanese as WO 2014/196541 A1 on Dec. 11, 2014. This application is based on and claims the benefit of priority from Japanese Patent Application Nos. 2013-117234, filed Jun. 3, 2013, and 2014-102313, filed May 16, 2014. The entire disclosures of all of the above applications are incorporated herein by reference.

TECHNICAL FIELD

The present invention relates to a radar apparatus that detects a target on the basis of the results of transmission/reception of radar waves, a method for inspecting an axis deviation of the radar apparatus, and a computer-readable recording medium in which a program to be executed by the radar apparatus is recorded.

BACKGROUND ART

Radar apparatuses mounted to vehicles are known. Such a radar apparatus includes a transmitting unit that transmits a radar wave, a receiving unit that receives a reflected wave of the radar wave with a receiving antenna, and a signal processor that detects an object that has reflected the radar wave, on the basis of the results of transmission/reception of the radar wave (refer to PTL 1).

CITATION LIST

Patent Literature

[PTL 1] JP-A-2011-217360

SUMMARY OF THE INVENTION

Technical Problem

This type of radar apparatus is mounted to a vehicle in such a way that a reference axis set in the radar apparatus aligns with an installation reference axis which is prescribed to the vehicle so as to be parallel to a horizontal plane. In a radar apparatus mounted in this way, there is a probability that the reference axis is deviated downward (inconsistently) in a vertical direction (vehicle height direction) relative to the installation reference axis, due to vibration during traveling of the vehicle or due to secular change, or the like, resultantly causing axis deviation.

When downward axis deviation occurs, the radar apparatus may erroneously detect an object set up on a road surface (such as a steel construction barrier) as a preceding vehicle or a road sign. When such an erroneous detection takes place, detection performance may be impaired or erroneous detection may take place during automatic cruise control or in a pre-crash safety system. Thus, there is a probability that expected performance of the radar apparatus is impaired.

Therefore, when downward axis deviation occurs, the installation conditions of the radar apparatus are required to be corrected so that the reference axis aligns with the installation reference axis. Thus, there is a need for detecting the occurrence of downward axis deviation.

As a method of realizing the need, the receiving unit may be configured by two-dimensionally arranging a plurality of receiving antennas in a vertical direction and a horizontal direction, and detecting the occurrence of downward axis deviation according to a vertical direction angle which is detected based on a reflected wave received by the receiving unit. As another method of realizing the need, an inclination sensor may be added as a component configuring the radar apparatus, and an inclination of the radar apparatus may be detected according to the detection results derived from the inclination sensor.

However, the above methods of realizing the need raise a problem of increasing the size of the configuration of the radar apparatus.

That is, conventional techniques have a problem of difficulty in detecting the occurrence of axis deviation, and at the same time minimizing the increase in size of the configuration of the radar apparatus.

Therefore, the present invention has as its object to detect the occurrence of axis deviation, and at the same time minimizing the increase in size of the configuration of the radar apparatus.

Solution to Problem

The present invention for achieving the object set forth above relates to a radar apparatus mounted to a vehicle.

A radar apparatus of a first invention includes transmitting means, receiving means, analyzing means, generating means, detecting means, and deviation determining means.

Of these means, the transmitting means transmits a radar wave composed of continuous waves at each prescribed measurement cycle. The receiving means receives, with a receiving antenna having vertical directivity, a reflected wave of the radar wave transmitted from the transmitting means, mixes the received reflected wave with a radar wave transmitted from the transmitting means, and generates a beat signal at each measurement cycle.

Each time the receiving means generates a beat signal, the analyzing means frequency-analyzes the beat signal and generates a spectrum distribution where the frequencies included in the beat signal are associated with frequency intensities of respective frequency components. The generating means generates a reflection intensity distribution where frequencies are associated with road surface reflection intensities indicating the reflection intensities of the radar wave from a road surface at respective frequencies, on the basis of a plurality of spectrum distributions generated by the analyzing means over a prescribed number of measurement cycles prescribed in advance.

The detecting means detects an intensity peak indicating a frequency that maximizes the road surface reflection intensity, in the reflection intensity distribution generated by the generating means. The deviation determining means determines at least whether or not the radar apparatus is in an axis deviation state on the basis of the intensity peak detected by the detecting means. The axis deviation state herein refers to a state where a reference axis of the radar apparatus has an inclination in a vehicle height direction relative to a horizontal axis prescribed to the vehicle, the inclination being not less than a prescribed angle.

In other words, usually, a preceding vehicle, an obstacle, and the like are present on a road on which the vehicle equipped with the radar apparatus is traveling. Therefore, the radar apparatus receives a reflected wave not only from the road surface but also from a preceding vehicle, an obstacle, or the like.

In this way, when a reflected wave from a preceding vehicle, an obstacle, or the like is received, in determining whether or not a radar apparatus is in an axis deviation state, a conventional radar apparatus is able to use neither the reflected wave from the road surface, nor the reflected intensity from the road surface, solely. This raises a problem of impairing the accuracy of determining whether or not the radar apparatus is in an axis deviation state. In other words, conventional technology requires further improvement in the accuracy of detecting whether or not the radar apparatus is in an axis deviation state.

In this regard, in the radar apparatus of the first invention, in determining whether or not the radar apparatus is in an axis deviation state, the intensity peak in the reception intensity distribution is used. The intensity peak is detected from a plurality of spectrum distributions generated over a prescribed number of measurement cycles, and has a highest probability as a distance to the road surface reflecting the main beam of a radar wave.

The radar apparatus of the first invention uses an intensity peak as an index when determining whether or not the radar apparatus is in an axis deviation state. Therefore, reflected waves from targets other than the road surface can be eliminated as much as possible using the index for determining whether or not the radar apparatus is in an axis deviation state. As a result, the radar apparatus of the first invention can improve the accuracy of determining whether or not the radar apparatus is in an axis deviation state.

In particular, in the radar apparatus of the first invention, a new configuration (structure) is not required to be added to the radar apparatus to determine whether or not the radar apparatus is in an axis deviation state. In other words, the radar apparatus of the first invention can detect the occurrence of axis deviation while minimizing increase in the size of the configuration of the radar apparatus.

A radar apparatus of a second invention may include a transmitting/receiving means, a target detecting means, and a deviation determining means. The transmitting/receiving means of the second invention transmits a radar wave composed of an electromagnetic wave and receives a reflected wave of the transmitted radar wave with a receiving antenna having vertical directivity in a vehicle height direction of the vehicle. The target detecting means detects a target that has reflected a radar wave on the basis of the results of transmission/reception of the radar wave performed by the transmitting/receiving means.

The deviation determining means determines that the radar apparatus is in an axis deviation state when a minimum reflection intensity in a specific distance is not less than a reference reflection intensity, on the basis of the results of transmission/reception of the radar wave performed by the transmitting/receiving means.

Normally, the radar apparatus of the second invention is mounted to a vehicle such that the main beam of a radar wave transmitted by the transmitting/receiving means is not reflected on the road surface. Therefore, when the radar apparatus is set up in a non-axis deviation state and a preceding vehicle or the like is not present on the road, the radar wave is not reflected and will have a reflection intensity of a small value.

When the reference axis has a downward inclination in the vehicle height direction relative to the horizontal axis but the inclination is small, the position on the road surface on which the main beam of the radar wave is reflected is away from the radar apparatus. In this case, the main beam is not emitted onto a position on the road surface near the receiving antenna of the radar apparatus. Therefore, the minimum reflection intensity is higher than the minimum reflection intensity in the non-axis deviation state, but lower than the reference reflection intensity.

However, when the downward inclination is large, the position on the road surface on which the main beam of the radar wave is reflected becomes closer in distance from the receiving antenna of the radar apparatus, and the minimum reflection intensity becomes higher than the reference reflection intensity.

In other words, in the second invention, whether or not the radar apparatus is in an axis deviation state can be determined through comparison of the minimum reflection intensity with the reference reflection intensity. The "specific distance" in the second invention refers to a range of a distance from the receiving antenna to a road surface reflecting the main beam when the downward inclination of the reference axis in the vehicle height direction relative to the horizontal axis becomes not less than a prescribed angle. The "reference reflection intensity" refers to a scattering intensity of the main beam of a radar wave from the road surface which is in the specific distance from the receiving antenna in the non-axis deviation state.

In particular, in the radar apparatus of the second invention, a new configuration (structure) is not required to be added to the radar apparatus to determine whether or not the radar apparatus is in an axis deviation state. In other words, in the second invention, the occurrence of axis deviation can be detected while size increase in the configuration of the radar apparatus can be minimized.

The present invention may also be configured as a program run by a computer provided to a radar apparatus. The present invention can be realized by various modes, such as a recording medium with the program recorded thereon, or an inspection method for an axis deviation state.

For example, when the present invention is configured as a program, the program may be recorded on a computer-readable recording medium, such as a digital versatile disk read-only memory (DVD-ROM), a compact disc read-only memory (CD-ROM), or a hard disk. The program may be loaded on a computer as necessary and started up, or may be acquired by a computer over a communication line as necessary and started up. The computer can function as the above-described means provided to the radar apparatus by allowing the computer to execute the respective procedures.

Reference signs in the parentheses in the claims indicate correlation with specific means in an embodiment provided as a mode and described hereafter, and thus should not limit the technical scope of the present invention.

BRIEF DESCRIPTION OF DRAWINGS

FIG. 6 illustrates explanatory diagrams, with (A) showing road surface reflection intensity in a non-axis deviation state, and with (B) showing road surface reflection intensity when a deviation angle is small;

FIG. 7 illustrates explanatory diagrams, with (A) showing road surface reflection intensity when a deviation angle is medium, and with (B) showing road surface reflection intensity when a deviation angle is large;

DESCRIPTION OF EMBODIMENTS

With reference to the drawings, some embodiments of the present invention will be described.

[First Embodiment]

Figure 1:
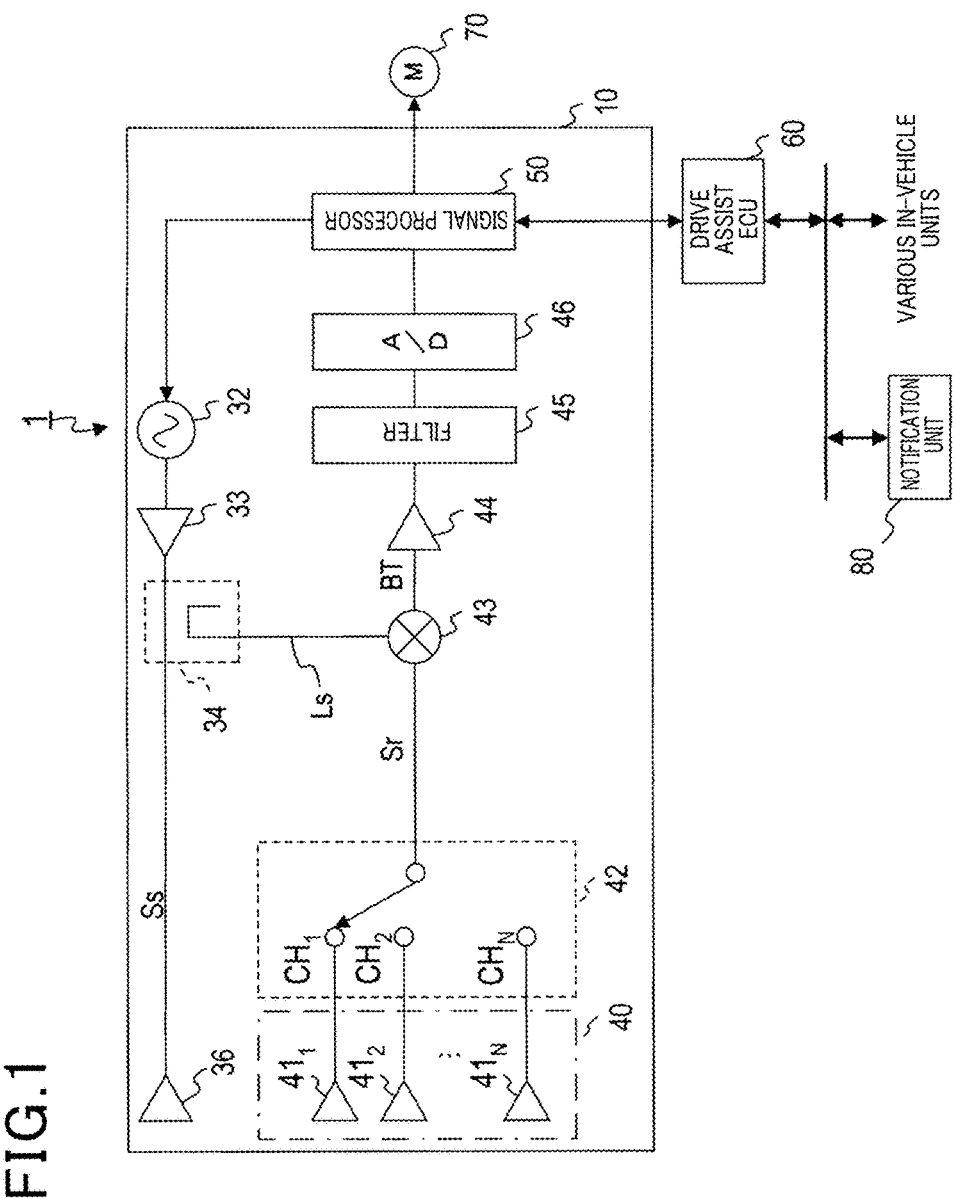
FIG. 1 is a schematic block diagram illustrating a configuration of an in-vehicle system centering on a radar apparatus to which the present invention is applied.

An in-vehicle system 1 shown in FIG. 1 includes a radar apparatus 10, a drive assist electronic control unit (ECU) 60, a notification unit 80, and a motor 70. The in-vehicle system 1 realizes known drive assist control, such as adaptive cruise control (ACC) or pre-crash safety system (PCS).

<Radar Apparatus>

Figure 2:
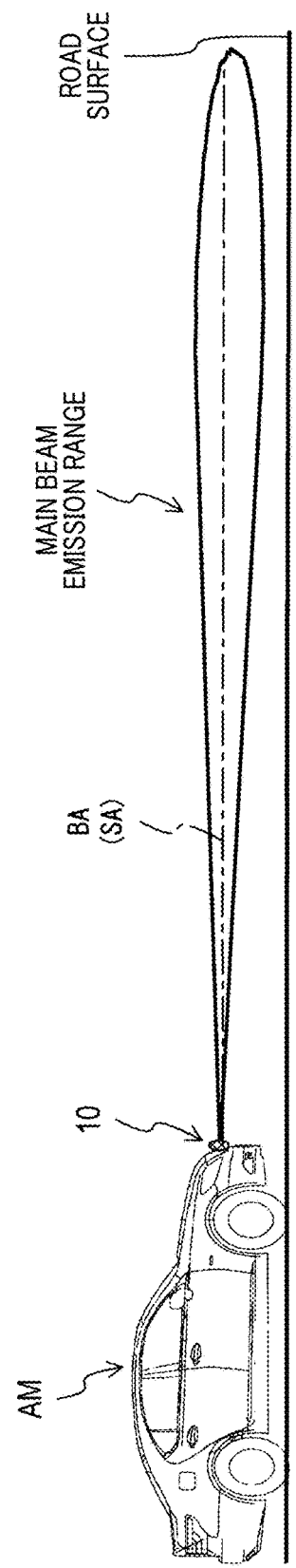
FIG. 2 is a diagram illustrating a state where the radar apparatus is mounted to an automobile.

The radar apparatus 10 is a millimeter wave radar mounted to an automobile AM (see FIG. 2). The radar apparatus 10 transmits a radar wave composed of a millimeter-waveband electromagnetic wave and receives a radar wave reflected by a target (reflected wave). Based on the results of the reception, the radar apparatus 10 detects the target. The automobile AM equipped with the radar apparatus 10 is referred to, hereafter, as an own vehicle AM.

The radar apparatus 10 includes an oscillator 32, an amplifier 33, a distributor 34, and a transmitting antenna 36. The oscillator 32 generates a millimeter-waveband high-frequency signal. The high-frequency signal is modulated to have, as a single modulation cycle, a rising period during which the frequency linearly increases (gradually increases) and a falling period during which the frequency linearly decreases (gradually decreases) relative to time. The amplifier 33 amplifies the high-frequency signal generated by the oscillator 32.

The distributor 34 power-distributes the output from the amplifier 33 into a transmission signal Ss and a local signal Ls. The transmitting antenna 36 emits a radar wave in accord with the transmission signal Ss. The radar apparatus 10 further includes a receiving antenna unit 40, a reception switch 42, a mixer 43, an amplifier 44, a filter 45, an A/D converter 46, and a signal processor 50.

The receiving antenna unit 40 includes N (N being a natural number of 2 or more) antennas $41_1$ to $41_N$ that receive a radar wave. The antennas $41_1$ to $41_N$ are arranged so as to have directivity in a vehicle height direction of the own vehicle AM (also referred to, hereafter, as a "vertical directivity"). The antennas $41_1$ to $41_N$ are respectively allocated with channels $CH_1$ to $CH_N$.

The reception switch 42 sequentially selects any of the antennas $41_1$ to $41_N$ and supplies a reception signal Sr from the selected antenna $41_1$ to $41_N$ to the subsequent stage. The mixer 43 mixes the reception signal Sr with a local signal Ls to generate a beat signal BT that indicates a difference in frequency between the transmission signal Ss and the reception signal Sr. The amplifier 44 amplifies the beat signal BT supplied by the mixer 43. The filter 45 removes unnecessary signal components from the beat signal BT generated by the mixer 43. The A/D converter 46 samples the output of the filter 45 for conversion into digital data.

The signal processor 50 is mainly configured by a known microcomputer that includes at least a read-only memory (ROM), a random access memory (RAM), and a central processing unit (CPU). The signal processor 50 also includes an arithmetic processing unit (e.g., digital signal processor (DSP)) for performing a fast Fourier transform (FFT) process or the like on data acquired via the analog-to-digital (A/D) converter 46.

The signal processor 50 controls the start and stop of the oscillator 32, and the sampling of the beat signal BT via the A/D converter 46. At the same time, the signal processor 50 performs signal processing using sampling data, and an information communication process in which information (e.g., vehicle speed) required for the signal processing and target information obtained as a result of the signal processing are transmitted to and received from the drive assist ECU 60.

Furthermore, the signal processor 50 uses sampling data of the beat signal BT to perform a target detection process. In the target detection process, the signal processor 50 detects a target that has reflected a radar wave and generates target information on the target.

The ROM of the signal processor 50 stores therein a processing program that enables the signal processor 50 to perform the target detection process.

As described above, the radar apparatus 10 is configured as a frequency modulated continuous wave (FMCW) radar.

The signal processor 50 is connected to the motor 70. The motor 70 is used for changing the mounting angle of the radar apparatus 10 in the vehicle height direction.

<Installation Mode of the Radar Apparatus>

As shown in FIG. 2, the radar apparatus 10 described above is mounted to a front surface (e.g., front grille) of the own vehicle AM in such a way that the main beam of a radar wave is emitted towards the travelling direction of the own vehicle AM. The radar apparatus 10 is mounted to the own vehicle AM in such a way that a reference axis BA set in the radar apparatus 10 aligns with an installation reference axis SA. The installation reference axis SA is parallel to the road surface (i.e. horizontal axis) and extends from the own vehicle AM towards the travelling direction of the own vehicle AM.

<Overview of the Operations of the Radar Apparatus>

In the radar apparatus 10, when the oscillator 32 oscillates in accord with a command from the signal processor 50, the oscillator 32 generates a high-frequency signal. The high-frequency signal is then amplified by the amplifier 33. The amplified high-frequency signal is power-distributed by the distributor 34 for generation of a transmission signal Ss and a local signal Ls. In the radar apparatus 10, of the generated signals, the transmission signal Ss is transmitted as a radar wave via the transmitting antenna 36.

The radar wave that has been sent from the transmitting antenna 36 and then reflected by a target (i.e. reflected wave) is received by all the antenna elements $41_1$ to $41_N$ configuring the receiving antenna unit 40. Only the reception signal Sr of the reception channel $CH_i$ (i=1 to N) selected by the reception switch 42 is amplified by the amplifier 33 and supplied to the mixer 43. The mixer 43 mixes the reception signal Sr with a local signal Ls from the distributor 34 to generate the beat signal BT. The beat signal BT is then removed with unnecessary signal components by the filter 45, followed by sampling by the A/D converter 46 and loading into the signal processor 50.

The reception switch 42 performs switching so that all of channels $CH_1$ to $CH_N$ are each selected a predetermined number of times (e.g., 512 times) during a single modulation cycle of the radar wave. The A/D converter 46 performs sampling synchronously with the switching timing. In other words, during a single modulation cycle of the radar wave, sampling data is accumulated for each of the channels $CH_1$ to $CH_N$ and for each of rising and falling periods of the radar wave. The signal processor 50 detects a target that has reflected a radar wave, and also derives a distance to each target, a speed relative to the target, and an azimuth (referred to, hereafter, as an "incoming azimuth") in which the target is present, on the basis of sampling values of the beat signal BT. The signal processor 50 then outputs the information including the information on each target (distance, relative speed, and incoming azimuth), as target information, to the drive assist ECU 60.

The drive assist ECU 60 shown in FIG. 1 realizes drive assist control by controlling other in-vehicle control units and other in-vehicle devices. The ACC, which is one of the drive assist controls, maintains the inter-vehicle distance between a preceding vehicle and the own vehicle to an appropriate distance. The PCS, which is one of the drive assist controls, increases the braking force and the seatbelt restraining force of the own vehicle when collision with an obstacle on a travelling road of the own vehicle is unavoidable.

The notification unit 80 is a known device that notifies information according to control signals. The notification unit 80 includes, for example, at least either of a display unit that displays information and an audio output unit that outputs information through speech sound. The display unit according to the present embodiment includes, for example, a display and a display lamp (warning lamp).

<Target Detection Process>

The target detection process is started at a cycle prescribed in advance (i.e. measurement cycle).

Figure 3:
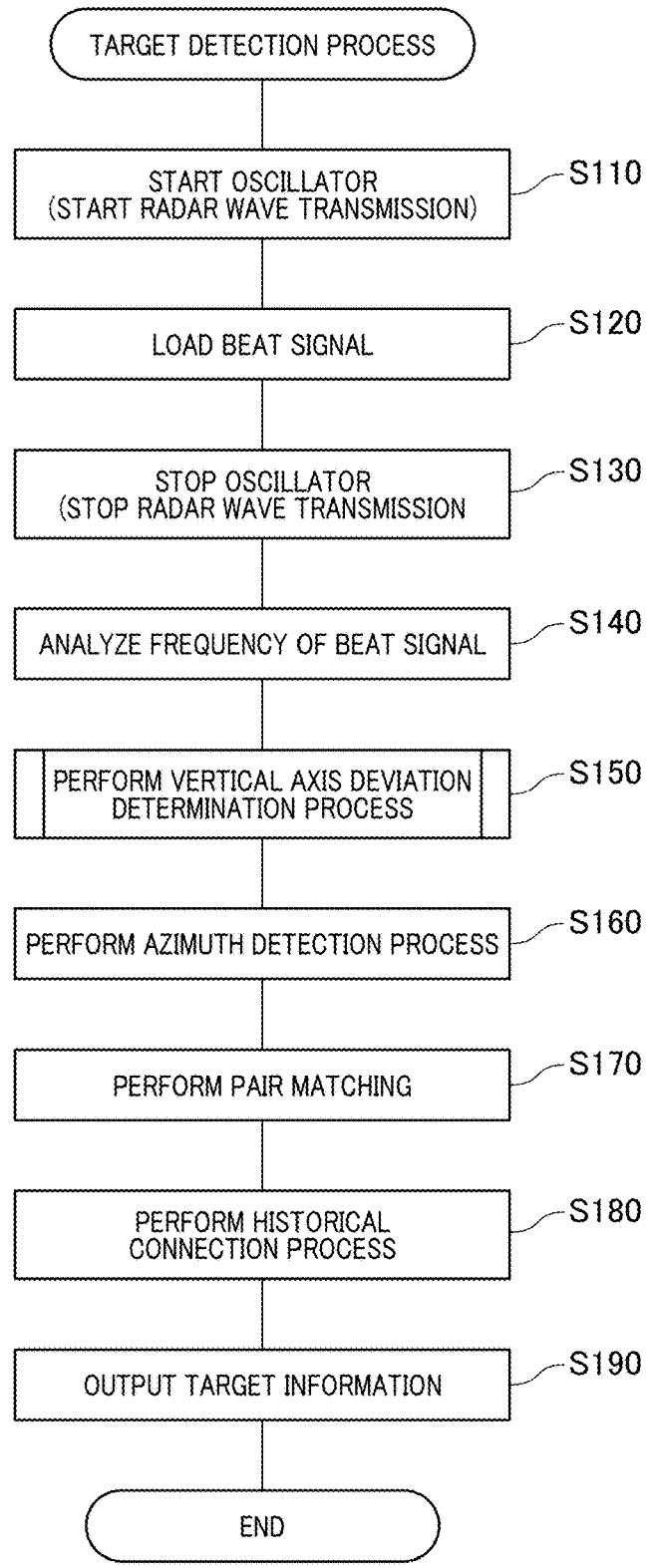
FIG. 3 is a flowchart illustrating a procedure of a target detection process.

As shown in FIG. 3, when the target detection process is started, the oscillator 32 is started first to start transmission of radar waves (step S110). Then, sampling values of the beat signal BT are acquired via the A/D converter 46 (step S120). When the required amount of sampling values is acquired, the oscillator 32 is stopped to thereby stop transmission of the radar waves (step S130).

Then, frequency analysis (FFT process in the present embodiment) is performed for sampling values of the beat signal BT acquired at step S130 to calculate a power spectrum of the beat signal BT for each of channels $CH_1$ to $CH_N$ and for each of rising and falling periods of the radar wave (step S140). The power spectrum indicates the frequencies included in the beat signal BT and the intensities of the frequencies.

Further, at step S140, frequency peaks $fbu_{1\ to\ m}$ in the power spectrum are detected in respect of the rising period, while frequency peaks $fbd_{1\ to\ m}$ in the power spectrum are detected in respect of the falling period. Each of the detected frequency peaks fbu and fbd indicates a probability of the presence of a candidate for a target (referred to, hereafter, as a "target candidate") which is the generation source of the reflected wave.

In the target detection process, a vertical axis deviation determination process is performed (step S150). In the vertical axis deviation determination process, it is determined whether or not the reference axis BA is in a state of being deviated with an inclination of not less than a prescribed angle in the vertical direction (vehicle height direction) relative to the installation reference axis SA. The radar apparatus 10 is mounted so that the reference axis BA aligns with the installation reference axis SA. However, there is a probability of occurring deviation due to the vibration caused during traveling of the automobile AM or due to secular change of the apparatus. This is the reason why the vertical axis deviation determination process is performed. Details of the vertical axis deviation determination process will be described later.

In the target detection process, subsequently, an azimuth detection process is performed (step S160). In the azimuth detection process, the incoming azimuth is estimated for the target candidate corresponding to each of the frequency peaks fbu and fbd, and incoming power is estimated, which indicates the reception power in receiving the reflected wave from the target candidate. For example, schemes that can be used as the azimuth detection process include known schemes, such as multiple signal classification (MUSIC) or digital beamforming. The incoming azimuth in the present embodiment refers to an azimuth (angle) in which a target is present relative to the reference axis BA set in the radar apparatus 10.

Using the incoming azimuth and the incoming power estimated at step S160, pair matching is performed (step S170). The pair matching is performed between the frequency peaks $fbu_{1\ to\ m}$ calculated from the beat signal BT in the rising period and frequency peaks $fbd_{1\ to\ m}$ calculated from the beat signal BT in the falling period to find a match in frequency peaks that are considered to be the reflections of radar waves from an identical target, and register the matched frequency peaks. The pair of frequency peaks fbu and fbd that are matched and registered are hereafter referred to as a frequency pair.

Specifically, at step S170 of the present embodiment, it is determined, for all combinations of the rising-period frequency peaks fbu and falling-period frequency peaks fbd, whether or not the difference in incoming power and the difference in incoming azimuth angle are within allowable ranges prescribed in advance. As a result of the determination, if it is determined that the difference in incoming power and the difference in incoming azimuth angle are within the allowable ranges, the corresponding pair of frequency peaks is rendered to be a frequency pair.

At step S170, a technique known in FMCW radar apparatuses is used for the registered frequency pair to derive a distance from the radar apparatus 10 to the target candidate and a relative speed between the target candidate and the own vehicle. At step S170 of the present embodiment, the speed of each target candidate is derived from the relative speed between the target candidate and the own vehicle and the speed of the own vehicle. At the same time, it is determined whether the target candidate is a stationary object or a moving object. Information is then prepared by adding the azimuth in which the target candidate is present to the derived distance and relative speed (speed), and the information is correlated with each frequency pair and registered as a target candidate.

Further, a historical connection process is performed to detect a frequency pair that corresponds to the identical target (step S180). The historical connection process is based on the information (i.e. distance, speed, and azimuth) on the frequency pairs registered at step S170 of the current transmission/reception cycle (referred to, hereafter, as current cycle pairs) and the information on the frequency pairs registered in the previous transmission/reception cycle (referred to, hereafter, as previous cycle pairs).

Specifically, in the historical connection process (step S180) of the present embodiment, all combinations of previous cycle pairs and current cycle pairs (referred to, hereafter, as combined pairs) are set and any one of the combined pairs is extracted. Then, the position where the current cycle pair is present (referred to, hereafter, as a predicted position) and the speed of the current cycle pair (referred to, hereafter, as a predicted speed) are derived. The position and the speed are predicted on the basis of the information on the previous cycle pair of the extracted combined pair. Since the derivation of the predicted position and the predicted speed is a known process, detailed description is omitted herein. However, for example, a Kalman filter or the like may be used for predicting the time-series behavior of a frequency pair (i.e. target candidate), and the predicted results may be used as the predicted position and predicted speed.

In the historical connection process, the derived predicted position and predicted speed, as well as the position and speed derived from the current cycle pair are used as bases to derive the position difference and speed difference between the both. That is, the position difference is a difference between the position derived from the current cycle pair (i.e. the position of the target candidate corresponding to the current cycle pair) and the predicted position. The speed difference is a difference between the speed derived from the current cycle pair (i.e. the speed of the target candidate corresponding to the current cycle pair) and the predicted speed.

Only when the position difference is less than a reference distance prescribed in advance and the speed difference is less than an upper limit speed difference set in advance, the frequency pairs configuring the combined pair are taken as corresponding to an identical target (i.e. having historical connection). In this case, the count value of a connection counter of the previous cycle pair is incremented by 1 to update the count value of the connection counter of the current cycle pair.

Specifically, in the historical connection process of the present embodiment, a current cycle pair that is historically connected to a previous cycle pair inherits the information (count value of the connection counter) on the corresponding previous cycle pair. The count value of the connection counter is maintained at zero if the current cycle pair has no historical connection to the previous cycle pair.

In the target detection process, a frequency pair whose historical connection has been confirmed to be not less than a preset recognition threshold is recognized and registered as an object, and the target information on the registered target is outputted to the drive assist ECU 60 (step S190). Specifically, at step S190 of the present embodiment, when the count value of the connection counter is not less than the recognition threshold, the historical connection of not less than the recognition threshold is regarded to have been confirmed.

Then, the target detection process of the current cycle is terminated and control waits until the next startup timing.

<Vertical Axis Deviation Determination Process>

Next, the vertical axis deviation determination process started at step S150 of the target detection process will be described.

Figure 4:
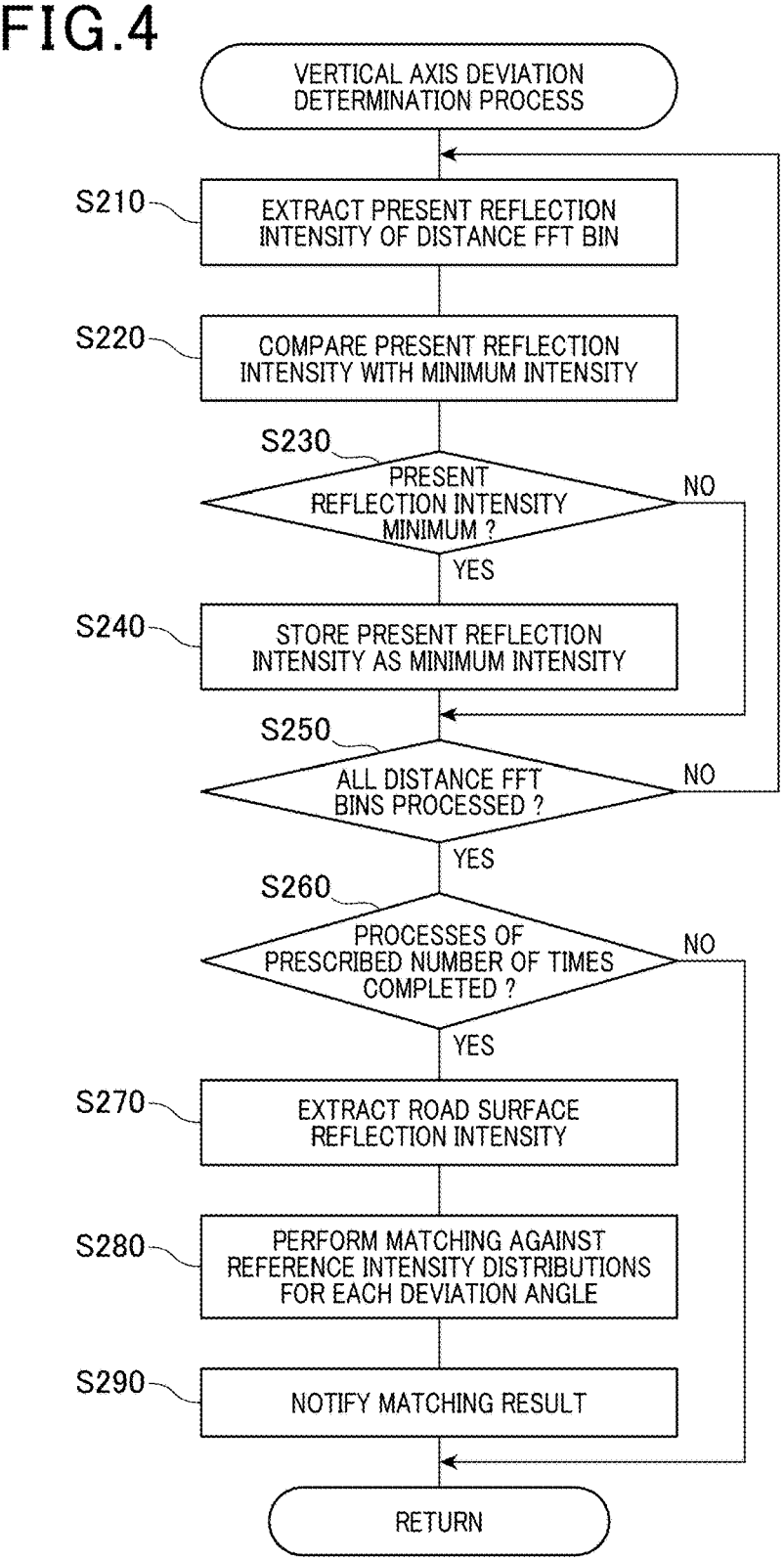
FIG. 4 is a flowchart illustrating a procedure of a vertical axis deviation determination process according to a first embodiment.

As shown in FIG. 4, in the vertical axis deviation determination process, reflection intensity (reception power) is extracted from a falling-period power spectrum calculated in the earlier target detection process at S140 (step S210). The reflection intensity is the intensity of reflection on the road surface and corresponds to a distance FFT bin included in the range of a specific distance prescribed in advance.

The specific distance of the present embodiment refers to the range of distance from the receiving antenna unit 40 to the road surface that reflects the main beam of the radar wave, when the downward inclination in the vehicle height direction of the reference axis BA relative to the horizontal axis (installation reference axis SA) becomes not less than a prescribed angle. The power spectrum from which the reflection intensity is extracted has already been converted to the power spectrum that indicates, for each distance FFT bin prescribed in advance, a distance from the radar apparatus 10 and the reflection intensity (reception intensity) in each distance.

A reflection intensity Pr of reflection from the road surface can be calculated by Formula (1) below. In Formula (1), a reference symbol Gtr denotes a directivity inclusive transmission/reception combined gain, a reference symbol H denotes a height [m] from the road surface to the radar apparatus 10, a reference symbol L denotes a distance along the horizontal direction from the own vehicle AM to the road surface corresponding to the distance FFT bin (see (A) of FIG. 8), and a reference symbol C2 is a constant prescribed in advance.

$$Pr = \frac{c2 \times Gtr(\mathrm{atan}(H/L))}{(L^2 + H^2)^2} \quad (1)$$

In other words, the reflection intensity Pr calculated by Formula (1) is dependent on the transmission/reception directivity, and the distance along the horizontal direction from the own vehicle AM to the road surface corresponding to the distance FFT bin.

The reception power in one single distance FFT bin extracted at S210 (referred to, hereafter, as a "present reflection intensity") is compared with a minimum value of reception power (referred to, hereafter, as a "minimum intensity value") in the distance FFT bin stored in the RAM of the signal processor 50 (step S220). As a result of the comparison at step S220, if the present reflection intensity is determined to be less than the minimum intensity value (YES at step S230), the present reflection intensity extracted at step S210 is stored as a minimum intensity value in the RAM of the signal processor 50 (step S240). In other words, the minimum intensity value is updated at step S240.

Subsequently, control proceeds to step S250. On the other hand, as a result of the comparison at step S220, if the present reflection intensity is determined to be not less than the minimum intensity value (NO at step S230), control proceeds to step S250 without performing step S240.

At step S250, it is determined whether or not steps S210 to S240 have been performed for all the reception powers (reflection intensities) of the distance FFT bin falling within the range of the specific distance. As a result of the determination, if it is determined steps S210 to S240 have not been performed for all the reception powers (reflection intensities) of the distance FFT bin (NO at step S250), control returns to step S210. At step S210 to which control has returned by way of step S250, one reception power (reflection intensity) of the distance FFT bin for which steps S210 to S240 have not been performed is extracted, and then control proceeds to step S220.

On the other hand, as a result of the determination at step S250, if it is determined that steps S210 to S240 have been performed for all the reception powers (reflection intensities) of the distance FFT bin (YES at step S250), control proceeds to step S260.

At step S260, it is determined whether or not the target detection process has been performed for the number of cycles prescribed in advance (referred to, hereafter, as "prescribed number of times"). The prescribed number of times herein is prescribed as the number of modulation cycles that can be performed during a predetermined period (e.g., 30 minutes) after start of the radar apparatus 10.

Then, as a result of the determination at step S260, if it is determined that the target detection process of the prescribed number of times has not been completed (NO at step S260), the present vertical axis deviation determination process is terminated and control returns to the target detection process. On the other hand, as a result of the determination at step S260, if it is determined that the target detection process of the prescribed number of times has been completed (YES at step S260), a road surface reflection intensity is extracted from the RAM of the signal processor 50 (step S270).

The road surface reflection intensity extracted at step S270 refers to a distribution of reflection intensity in which the minimum intensity values stored in the RAM of the signal processor 50 are arranged, for each distance FFT bin, according to the distance from the receiving antenna unit 40. The road surface reflection intensity corresponds to the "minimum reflection intensity" recited in the claims.

Figure 5:
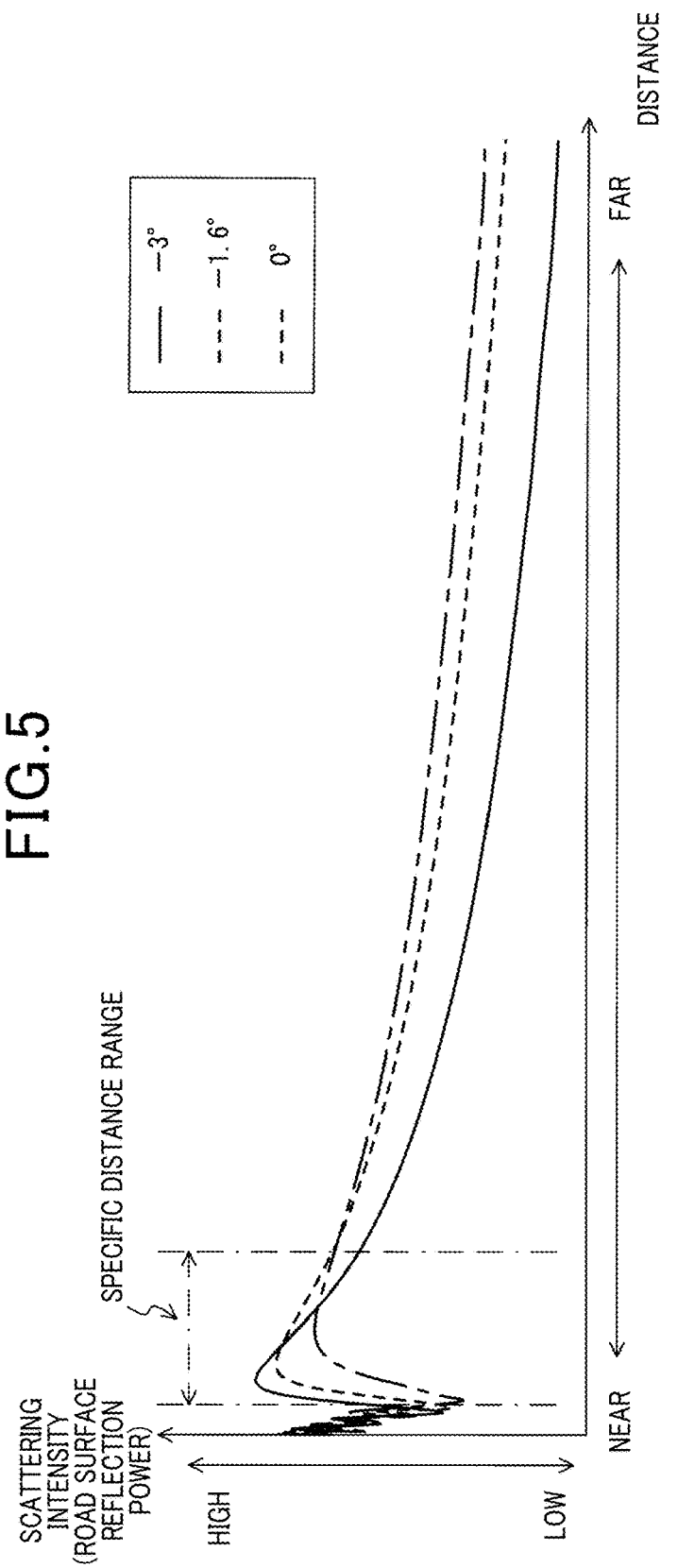
FIG. 5 is an explanatory diagram illustrating a reference intensity distribution.

Subsequently, the road surface reflection intensity extracted at step S270 is matched against each reference intensity distribution prepared in advance (step S280). As shown in FIG. 5, the reference intensity distribution of the present embodiment indicates scattering intensity of the main beam of the radar wave from the road surface, according to the distance from the receiving antenna unit 40. The reference intensity distribution includes the reflection intensity of the main beam of the radar wave from the road surface within the specific distance from the receiving antenna unit 40. In other words, the reference intensity distribution includes the reception intensity of the reflected wave from the road surface located in the specific distance (referred to, hereafter, as "specific reflection intensity").

The specific reflection intensity is calculated in advance through experiments or the like for each deviation angle (i.e. inclination) θ (see FIG. 8) prescribed as an angle of the reference axis BA relative to the installation reference axis SA. The reference reflection intensities are prepared in advance for each deviation angle θ. The deviation angles θ, based on which the specific reflection intensities are calculated, include zero degrees, or in other words, a non-axis deviation state. The specific reflection intensity calculated in the non-axis deviation state corresponds to the reference reflection intensity recited in the claims.

The deviation angles θ, based on which the specific reflection intensities are calculated, include a plurality of angles at which the reference axis BA is inclined downward in the vertical direction relative to the installation reference axis SA (e.g., −1.6 degrees or −3.0 degrees).

At step S280 of the present embodiment, the road surface reflection intensity is matched against the reference intensity distribution in the non-axis deviation state. As a result of the matching, if a correlation value is not less than a prescribed threshold set in advance, the radar apparatus 10 is taken to be in an axis deviation state. Then, the road surface reflection intensity is matched against each reference of the intensity distributions. As a result of the matching, a deviation angle θ corresponding to a reference intensity distribution that maximizes the correlation value is specified as the inclination of the reference antenna unit 40 relative to the installation reference axis SA.

The matching result at step S280 is notified by the notification unit 80 (step S290). That is, at step S290, if it is determined that the radar apparatus 10 is in the axis deviation state, a notification accordingly is given together with the inclination of the receiving antenna unit 40 relative to the installation reference axis SA.

Subsequently, the present vertical axis deviation determination process is terminated and control returns to step S160 of the target detection process.

FIGS. 6 and 7 are diagrams (spectrograms) showing the reception powers (reflection intensities) in distance FFT bins, with the distance from the receiving antenna unit 40 being on the vertical axis and the time progression being on the horizontal axis. Of the diagrams, (A) of FIG. 6 is a spectrogram showing the non-axis deviation state, (B) of FIG. 6 is a spectrogram showing a state where the deviation angle is −1.6 degrees, (A) of FIG. 7 is a spectrogram showing a state where the deviation angle is −2.2 degrees, and (B) of FIG. 7 is a spectrogram showing a state where the deviation angle is −3.0 degrees.

The frames enclosed by the broken lines in FIGS. 6 and 7 each indicate the range of the specific distance. In the specific distance range, the reception power (reflection intensity) is smaller as the brightness is lower and larger as the brightness is higher. The low brightness traversing the specific distance range in the distance direction (vertical axis) indicates that another vehicle or the like has passed.

Normally, the radar apparatus 10 is mounted so that the reference axis BA aligns with the installation reference axis SA. The main beam of the radar wave emitted from the radar apparatus 10 mounted in this way normally is not reflected on the road surface.

Figure 8:
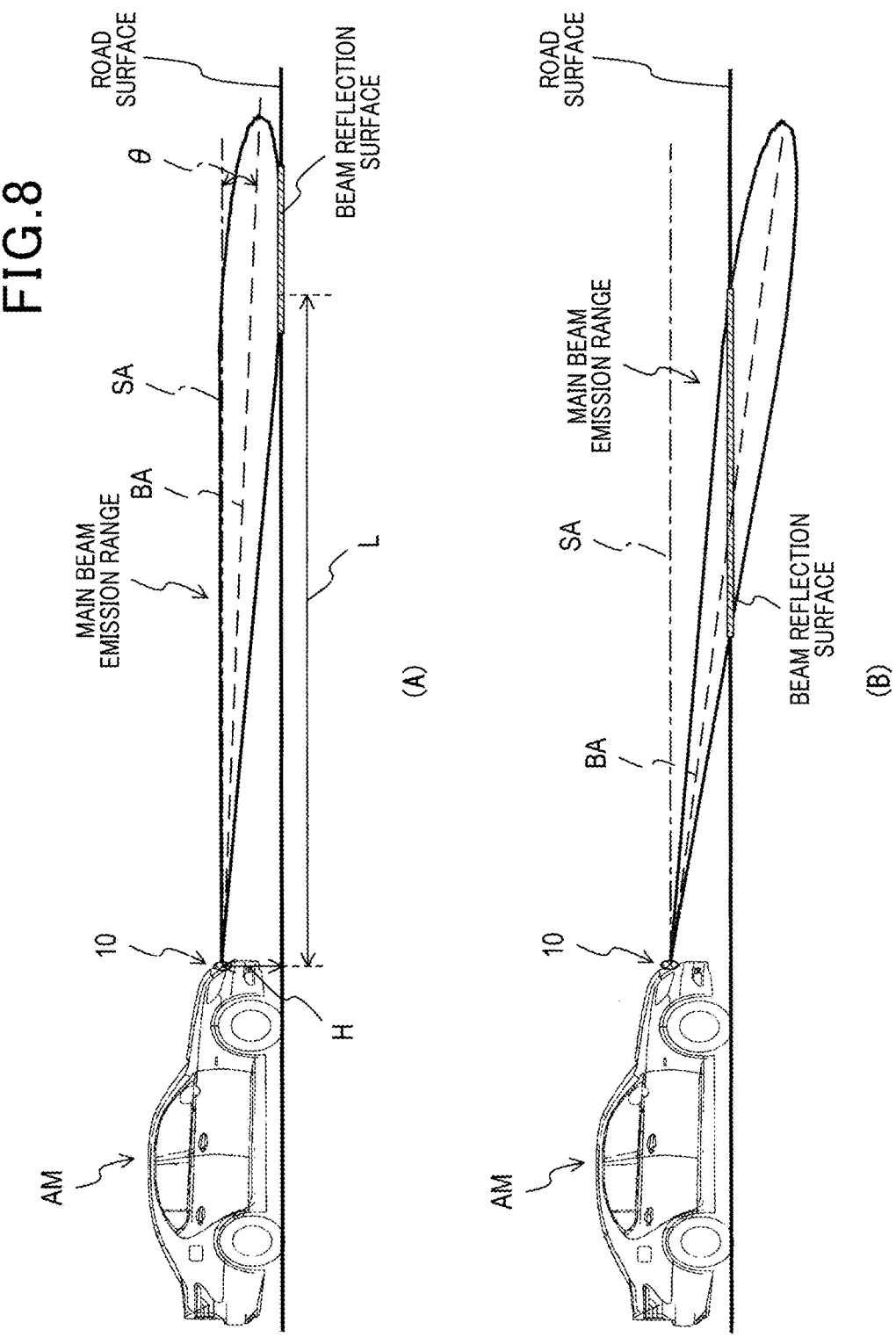
FIG. 8 illustrates explanatory diagrams, with (A) showing a beam reflection position on a road surface when a deviation angle is small, and with (B) showing a beam reflection position on a road surface when a deviation angle is large.

Therefore, as shown in FIG. 6 by (A), the reception powers (reflection intensities) of the distance FFT bins within the specific distance range are low. However, due to the vibration caused by the traveling of the automobile AM or due to secular change, or the like, when the reference axis BA inclines downward along the vertical direction relative to the installation reference axis SA, as shown in FIG. 8 by (A), the main beam of the radar wave is reflected on the road surface. The radar wave (reflected wave) reflected on the road surface is received by the radar apparatus 10.

Then, as shown in FIG. 8 by (B), when the downward angle of the reference axis BA along the vertical direction relative to the installation reference axis SA increases, the road surface reflecting the main beam of the radar wave is located closer to the radar apparatus. In this case, there is an increase in the reflection intensity of the radar wave received by the radar apparatus 10 from the road surface. Moreover, as shown in FIG. 6 by (B) and FIG. 7 by (A) and (B), the reception power (reflection intensity) is intensified as the deviation angle θ increases.

[Advantageous Effects of the First Embodiment]

As described above, the radar apparatus 10 matches a road surface reflection intensity against each reference intensity distribution to determine whether or not the apparatus is in an axis deviation state.

In particular, at step S280 of the vertical axis deviation determination process, the road surface reflection intensity is matched against the reference intensity distribution in the non-axis deviation state. As a result of the matching, if the correlation value is not less than the prescribed threshold, the apparatus is taken to be in an axis deviation state. In addition, as a result of matching the road surface reflection intensity against each reference intensity distribution, the deviation angle θ corresponding to the reference intensity distribution that maximizes the correlation value is specified as the inclination of the receiving antenna unit 40 relative to the installation reference axis SA.

Thus, the radar apparatus 10 is able to detect the axis deviation state and specify the inclination if the apparatus is in the axis deviation state. In addition, the radar apparatus 10 is not required to be additionally provided with a new configuration (structure) to determine whether or not the radar apparatus 10 is in the axis deviation state.

According to the radar apparatus 10, occurrence of an axis deviation can be detected while minimizing the size of the configuration of the radar apparatus 10. In addition, the road surface reflection intensity derived by the radar apparatus 10 is generated by extracting a minimum reception intensity of each distance FFT bin, during the transition of the reception intensity of the reflected wave along the time axis in the specific distance range. Thus, the road reflection intensity is obtained by passing, through a minimum value filter, the transition of the reception intensity of the reflected wave along the time axis in the specific distance range.

That is, the radar apparatus 10 is able to remove the temporarily increased intensity, such as when a preceding vehicle has cut across in front of the own vehicle AM, from the road surface reflection intensity. Thus, the road surface reflection intensity can more accurately indicate the reflection intensity from the road surface. In other words, the radar apparatus 10 can further improve the detection accuracy of whether or not the apparatus is in an axis deviation state.

The radar apparatus 10 that performs the vertical axis deviation determination process is an FMCW radar. Therefore, in the radar apparatus 10, when the own vehicle AM is traveling, the frequency of a beat signal based on a reflected wave from a stationary object increases due to Doppler shift.

According to the radar apparatus 10 described above, reflection from a stationary object as a road surface has a frequency, or apparent range distance (observed value) Robs, that shifts in conformity with the speed Vam of the own vehicle AM. When a true range distance (ideal value) is Rtru, the height of the radar from the road surface is H, and an appropriate conversion coefficient is Cr, a relationship of the following Formula (2) is established.

$$Robs = Rtru + Cr \times Vam \times \cos\left(\text{atan}\left(\frac{H}{\sqrt{Rtru^2 - H^2}}\right)\right) \quad (2)$$

Figure 9:
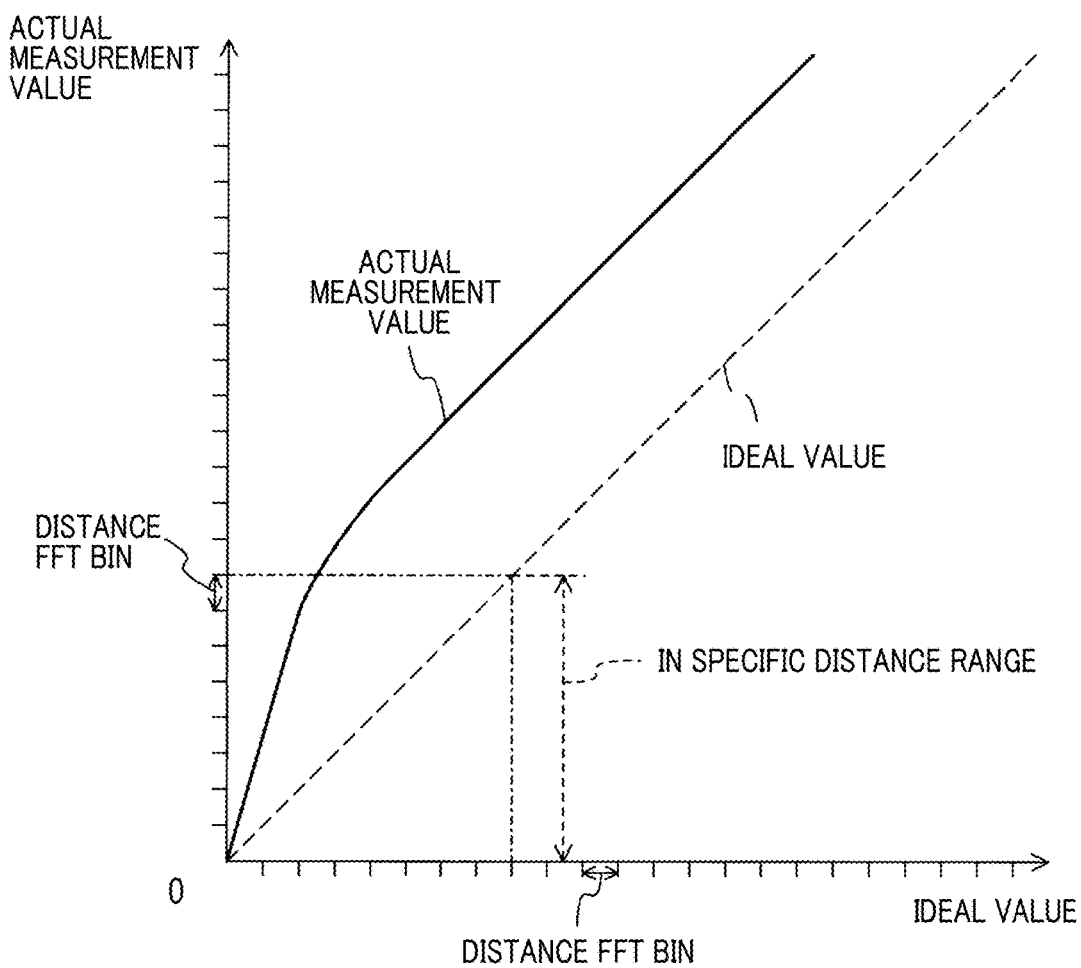
FIG. 9 is an explanatory diagram illustrating one of effects of the first embodiment.

Formula (2) is shown in FIG. 9. As shown in FIG. 9, a short range is observed being enlarged. With the relationship shown in FIG. 9, resolution of the measured value relative to the ideal value can be made finer within the specific distance (i.e. short range) for which the reflection from the road surface is desired to be monitored. Thus, the radar apparatus 10 can further improve the detection accuracy of whether or not the apparatus is in an axis deviation state.

In the vertical axis deviation determination process, when the radar apparatus 10 is determined to be in an axis deviation state as a result of the matching at step S280, a notification accordingly is informed together with the inclination of the receiving antenna unit 40 relative to the installation reference axis SA.

Accordingly, in the in-vehicle system 1, the axis deviation state can be recognized by an occupant of the own vehicle AM. As a result, the installation state of the radar apparatus 10 can be adjusted by a car dealer or the like.

[Second Embodiment]

An in-vehicle system according to a second embodiment differs from the in-vehicle system 1 according to the first embodiment mainly in terms of the vertical axis deviation determination process performed by the signal processor 50 of the radar apparatus 10. Therefore, in the present embodiment, the same reference symbols are given to components and processes similar to those of the first embodiment to omit description. The following description is focused on the vertical axis deviation determination process that differs from the first embodiment.

<Vertical Axis Deviation Determination Process>

Figure 10:
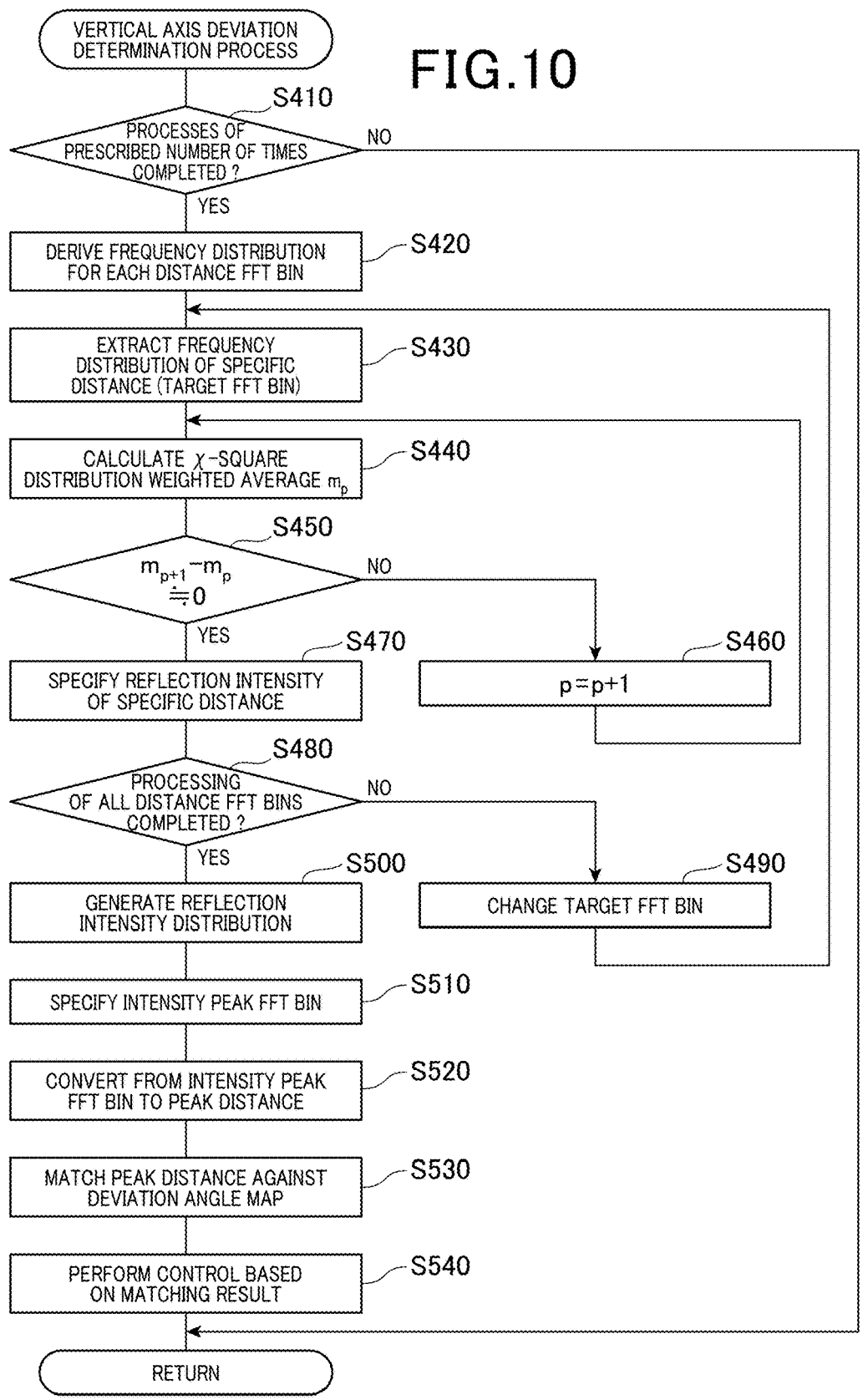
FIG. 10 is a flowchart illustrating a procedure of a vertical axis deviation determination process according to a second embodiment.

As shown in FIG. 10, in the vertical axis deviation determination process of the present embodiment, it is determined, first, whether or not the target detection process has been performed by the number of measurement cycles prescribed in advance (step S410). As a result of the determination at step S410, if it is determined that the target detection process has not been performed by the prescribed number of times (NO at step S410), the vertical axis deviation determination process is terminated and control returns to step S160 of the target detection process.

Figure 11:
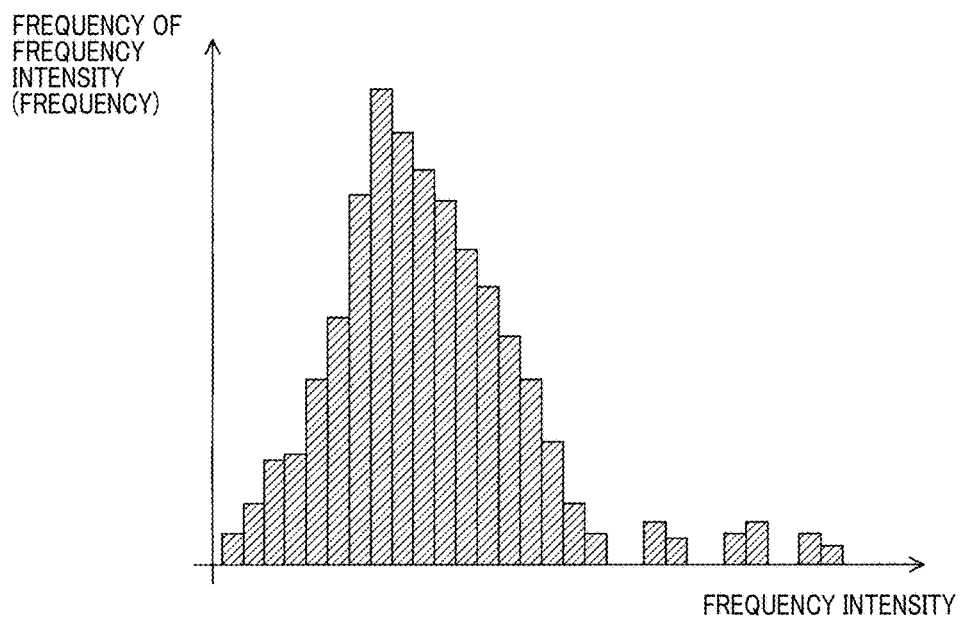
FIG. 11 is a diagram illustrating an example of intensity frequency distribution derived from the vertical axis deviation determination process according to the second embodiment.

On the other hand, as a result of the determination at step S410, if it is determined that the target detection process has been performed the prescribed number of times (YES at step S410), an intensity frequency distribution is derived for each distance FFT bin in the power spectrum obtained at step S140 (step S420). Specifically, at step S410, one frequency (i.e. distance FFT bin) is specified in the power spectrum (i.e. spectrum distribution) obtained at the earlier step S140. In respect of the specified distance FFT bin, the frequency intensities over the predetermined number of measurement cycles are totalized. Then, an intensity frequency distribution as shown in FIG. 11 is derived.

The intensity frequency distribution indicates a correlation (i.e. distribution) between the totalized frequency intensities (referred to, hereafter, as frequency of frequency intensity) and the frequency intensities in the distance FFT specified earlier.

This series of steps is performed for all distance FFT bins in the power spectrum. Then, in the vertical axis deviation determination process, the intensity frequency distribution of a distance FFT bin (referred to, hereafter, as a "target FFT bin") corresponding to a distance within the specific distance range is extracted from among the intensity frequency distributions derived at step S420 (step S430). Furthermore, the intensity frequency distribution extracted at step S430 is used as a basis to calculate a χ(chi)-square distribution weighted average $m_{p+1}$ using following Formula (3) (step S440).

$$m_{p+1} = \frac{1}{k}(\alpha_{p0} \cdot x_0 + \alpha_{p1} \cdot x_a + \ldots + \alpha_{pk} \cdot x_k) \quad (3)$$

In Formula (3), a reference symbol α denotes a probability density of the χ(chi)-square distribution of an average $m_p$, and x denotes a frequency of frequency intensity. Further, a reference symbol p+1 herein denotes an iteration count in one intensity frequency distribution.

That is, at step S440, the frequency of frequency intensity in the intensity frequency distribution derived at step S420 and the average $m_p$ are substituted into Formula (3) to calculate the χ(chi)-square distribution weighted average $m_p$ at the iteration count p.

In the vertical axis deviation process, it is determined whether or not the difference between the χ(chi)-square distribution weighted average $m_{p+1}$ and the χ(chi)-square distribution weighted average $m_p$ meets a convergence condition (step S450). The convergence condition at step S450 is, for example, not more than a set value that has been preset as can be regarded as 0.

As a result of the determination at step S450, if it is determined that the difference between the χ(chi)-square distribution weighted average $m_{p+1}$ and the χ(chi)-square distribution weighted average $m_p$ does not meet the convergence condition (NO at step S450), the iteration count p is incremented by 1 (step S460). Then, control returns to step S440 to calculate the χ(chi)-square distribution weighted average $m_p$ of the iteration count p that has been incremented by 1 (step S440). Specifically, at step S440, a χ(chi)-square distribution weighted average $m_{p-1}$ for the iteration count p-1 is set as a center of the χ(chi)-square distribution at the iteration count p, and the χ(chi)-square distribution weighted average $m_p$. is calculated On the other hand, as a result of the determination at step S450, if it is determined that the difference between the χ(chi)-square distribution weighted average $m_{p+1}$ and the χ(chi)-square distribution weighted average $m_p$ meets the convergence condition (YES at step S450), control proceeds to step S470. At step S470, the frequency of frequency intensity corresponding to the χ(chi)-square distribution weighted average $m_p$ s specified as the road surface reflection intensity of the target FFT bin.

Subsequently, it is determined whether or not steps S430 to S470 have been performed for all distance FFT bins prescribed in advance (step S480). As a result of the determination at step S480, if it is determined that steps S430 to S470 have not been performed for all distance FFT bins prescribed in advance (NO at step S480), the target FFT bin is changed (step S490) and control returns to step S430. At step S430, the intensity frequency distribution corresponding to the changed target FFT bin is extracted and thereafter steps up to step S480 are performed.

On the other hand, as a result of the determination at step S480, if it is determined that steps S430 to S470 have been performed for all distance FFT bins prescribed in advance (YES at step S480), a reflection intensity distribution is generated (step S500). The reflection intensity distribution is generated by associating the road surface reflection intensities of the distance FFT bin specified at step S470 with those of the respective distance FFT bins.

Then, an intensity peak FFT bin is specified based on the reflection intensity distribution generated at step S500 (step S510). The intensity peak FFT bin refers to a distance FFT bin that maximizes the road surface reflection intensities in the reflection intensity distribution.

Then, the intensity peak FFT bin identified at step S510 is converted to a distance (referred to, hereafter, as "peak distance") corresponding to the intensity peak FFT bin (step S520). Further, the peak distance is matched against a deviation angle map, and a deviation angle is specified (step S530).

Figure 12:
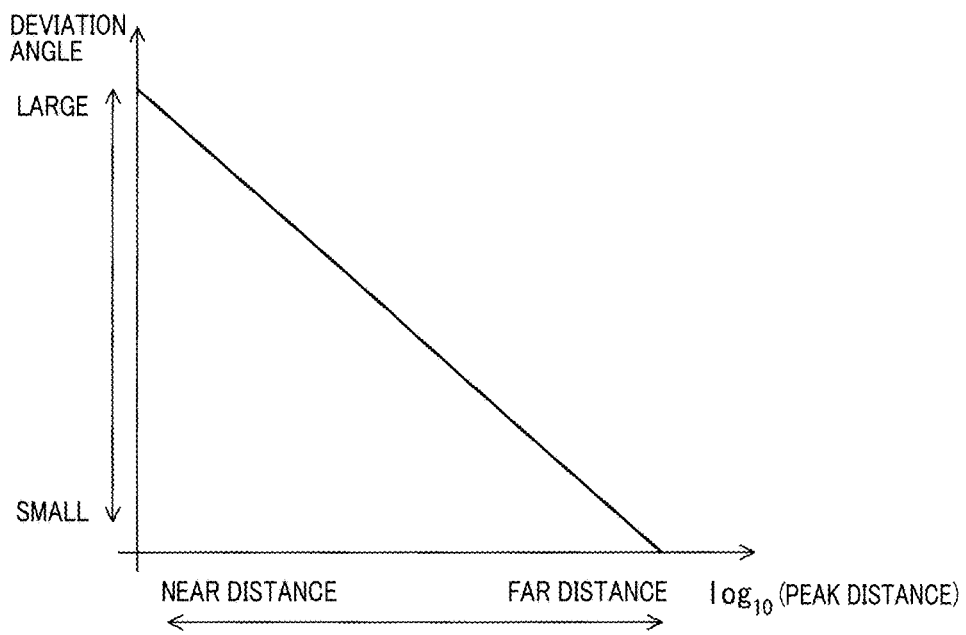
FIG. 12 is a diagram illustrating an example of a deviation angle map used in the vertical axis deviation determination process according to the second embodiment.

The deviation angle map referred to herein indicates a correlation between an angle of the reference axis along the vertical direction relative to the horizontal axis (i.e. deviation angle) and a peak distance. The deviation angle map is calculated in advance through experiments and the like. However, as shown in FIG. 12, in the deviation angle map of the present embodiment, a peak distance is expressed by a common logarithm. As the peak distance becomes a short range, the amount of downward axis deviation increases.

Further, in the vertical axis deviation determination process, various controls are performed based on the deviation angle specified at step S530 (step S540). The various controls herein may be driving the motor 70 such that an absolute value of the deviation angle of the reference axis relative to the horizontal axis is less than a prescribed angle, or may be notifying the deviation angle via the notification unit 80. In particular, the various controls at step S540 may be performed only when the deviation angle is not less than the prescribed angle.

Thereafter, the vertical axis deviation determination process is terminated and control returns to step S160 of the target detection process. In other words, the vertical axis deviation determination process of the present embodiment specifies the frequency intensity (i.e. the road surface reflection intensity) as the reflection intensity having a highest probability of reflecting a radar wave on a road surface in each distance FFT bin. The vertical axis deviation determination process of the present embodiment specifies the distance FFT bin as the intensity peak FFT bin having a highest road surface reflection intensity in the reflection intensity distribution indicating the correlation between the road surface reflection intensity and the distance FFT bin.

Further, in the vertical axis deviation determination process of the present embodiment, a deviation angle is specified through matching of the specified intensity peak FFT bin against the deviation angle map, and processings are performed on the basis of the specified deviation angle.

[Advantageous Effects of the Second Embodiment]

Specifically, usually, a preceding vehicle, an obstacle, or the like is present on the road on which the automobile AM equipped with the radar apparatus 10 travels. Therefore, the radar apparatus 10 receives the reflected wave from the preceding vehicle, the obstacle, or the like, in addition to the reflected wave from the road surface.

When the reflected waves from the preceding vehicles, obstacles, or the like are received, a conventional radar apparatus has the following problem in determining whether or not a radar apparatus is in an axis deviation state. Specifically, a conventional radar apparatus in such a case is not able to use solely the reflected wave from the road surface, or the intensity of the reflected wave from the road surface, and thus the accuracy is impaired in determining whether or not the radar apparatus is in an axis deviation state. In other words, conventional technology requires further improvement in the accuracy of detecting whether or not the radar apparatus is in an axis deviation state.

In this regard, the radar apparatus 10 of the present embodiment uses the intensity peak FFT bin in the reception intensity distribution in determining whether or not the radar apparatus 10 is in an axis deviation state. The intensity peak FFT bin is detected from a plurality of spectrum distributions generated over a prescribed number of measurement cycles, and is most likely to be the distance to the road surface, over which the main beam of the radar wave is reflected.

Accordingly, the radar apparatus 10 of the present embodiment can use the reflected wave from the road surface as an indicator in determining whether or not the apparatus is in an axis deviation state, and can remove the reflected waves from targets other than the road surface. As a result, the radar apparatus 10 of the present embodiment improves the accuracy of determination as to whether or not the apparatus is in an axis deviation state.

In particular, the radar apparatus 10 of the present embodiment is not required to be additionally provided with a new configuration (structure) to determine whether or not the apparatus is in an axis deviation state. In other words, the radar apparatus 10 of the present embodiment can detect the occurrence of axis deviation, while minimizing the size of the configuration of the apparatus.

The distribution of reflection intensities of a radar wave from an even plane (road surface intensity distribution) can generally be approximated by a chi-square distribution. An ideal road surface is an even plane. In the radar apparatus 10 of the present embodiment, a road surface reflection intensity in each distance FFT bin is rendered to be a value to which the chi-square distribution weighted average m converges in the intensity frequency distribution.

Accordingly, the radar apparatus 10 of the present embodiment can specify the road surface reflection intensity of each distance FFT bin with more accuracy, or further, can generate a more highly accurate reflection intensity distribution. Thus, the radar apparatus 10 can further improve the accuracy of determination as to whether or not the apparatus is in an axis deviation state.

The radar apparatus 10 of the present embodiment matches the intensity peak FFT bin against the deviation angle map to specify a deviation angle, and carries out processings on the basis of the specified deviation angle. Thus, the radar apparatus 10 can more reliably specify a deviation angle.

Moreover, the radar apparatus 10 corrects the angle of mounting the radar apparatus 10 in such a way that the angle of the reference axis relative to the horizontal axis is less than a prescribed angle. Thus, the radar apparatus 10 can maintain accuracy in detecting the location of a target.

[Other Embodiments]

Embodiments of the present invention have so far been described. The present invention should not be construed as being limited to the above embodiments, but may be implemented in various modes without departing from the spirit of the present invention.

For example, at step S280 in the vertical axis deviation determination process of the first embodiment described above, the following two processings (1) and (2) are performed. However, the processings performed at step S280 are not limited to these.

(1) A processing of matching the road surface reflection intensity against the reference intensity distribution corresponding to a non-axis deviation state, followed by determining the apparatus as being in an axis deviation state if the correlation value is not less than a prescribed threshold.

(2) A processing of matching the road surface reflection intensity against each of the reference intensity distributions, followed by specifying a deviation angle θ corresponding to the reference intensity distribution that maximizes the correlation value, as an inclination of the receiving antenna unit 40 relative to the installation reference axis SA.

That is, at step S280 of the vertical axis deviation determination process, only one of (1) and (2) may be performed. Further, the apparatus may be determined to be in an axis deviation state if the following condition is met instead of (1). Specifically, the condition is that a minimum of the road surface reflection intensities is not less than the reference reflection intensity that is the scattering intensity of the main beam of a radar wave from the road surface which is located in a specific distance from the receiving antenna unit 40 in a non-axis deviation state.

In the radar apparatus 10 of the first and second embodiments, the modulation cycle of the frequency of the radar wave is taken as having the rising period in which the frequency linearly increases (gradually increases) and the falling period in which the frequency linearly decreases (gradually decreases), relative to time. However, the modulation cycle of the frequency of the radar wave may have, as a single modulation cycle, only the falling period during which the frequency linearly decreases (gradually decreases).

In the vertical axis deviation determination process of the second embodiment, the χ(chi)-square distribution weighted average $m_{p+1}$ is calculated to obtain the road surface reflection intensity. However, the distribution of the reflected wave from the road surface used for obtaining the road surface reflection intensity is not limited to the chi-square distribution, but may be approximated using a Gaussian distribution (normal distribution).

The radar apparatus 10 of the first embodiment is a FMCW radar. However, the radar apparatus to which the second subject matter recited in the claims is applied is not limited to the FMCW radar. Any radar apparatus may be used as long as the radar apparatus is capable of specifying the reflection intensity for each distance on the basis of a signal received by a receiving antenna having directivity in the vertical direction.

The radar apparatus 10 of the second embodiment is a FMCW radar. However, the radar apparatus to which the first subject matter recited in the claims is applied is not limited to the FMCW radar. The radar apparatus may be a radar apparatus, such as a continuous wave (CW) radar or a two-frequency CW, which is capable of specifying the reflection intensity for each distance on the basis of a signal received by a receiving antenna having directivity in the vertical direction may be used.

The present invention should encompass those embodiments which are obtained by omitting some of the components of the above embodiments to an extent of enabling solution of the problem. The present invention should also encompass those embodiments which are obtained by appropriately combining the above embodiments with variation modifications. The present invention should encompass any embodiment conceivable without departing from the spirit of the present invention specified by the wordings recited in the claims.

For example, in the radar apparatus 10 of the first embodiment, the oscillator 32, the amplifier 33, the distributor 34, the transmitting antenna 36, the antenna 41, the reception switch 42, the mixer 43, the amplifier 44, the filter 45, and the A/D converter 46 configure the transmitting/receiving means. The signal processor 50 configures the target detecting means (steps S110 to S140, and steps S150 to S180), the deviation determining means (steps S210 to S270: distribution deriving means (step S260), and determining means (step S270)), and the notifying means (step S280). However, the present invention is not limited to this. Any configuration is applicable as long as the configuration is capable of realizing the functions of the respective means.

In the radar apparatus 10 of the second embodiment, the oscillator 32, the amplifier 33, the distributor 34, and the transmitting antenna 36 configure the transmitting means. The antenna 41, the reception switch 42, the mixer 43, the amplifier 44, the filter 45, and the A/D converter 46 configure the receiving means. The signal processor 50 configures the analyzing means (step S140), the generating means (steps S410 to S490: frequency deriving means (step S420), identifying means (steps S430 to S460), and distribution generating means (step S470)), the detecting means (step S510), the deviation determining means (steps S520 and S530), the correcting means (step S540), and the notifying means (step S540). However, the present invention is not limited to this. Any configuration is applicable as long as the configuration is capable of realizing the functions of the respective means.

REFERENCE SIGNS LIST 1 in-vehicle system
10 radar apparatus
32 oscillator
33 amplifier
34 distributor
36 transmitting antenna
40 receiving antenna unit
41 antenna
42 reception switch
43 mixer
44 amplifier
45 filter
46 A/D converter
50 signal processor
60 drive assist ECU
80 notification unit

The invention claimed is:

1. A radar apparatus that is mounted to a vehicle, the radar apparatus comprising:
  transmitting means that transmits a radar wave composed of continuous waves at a prescribed measurement cycle;
  receiving means that receives a reflected wave of the radar wave transmitted by the transmitting means by a receiving antenna having vertical directivity, and mixes the received reflected wave with a radar wave transmitted by the transmitting means to generate a beat signal at each measurement cycle;
  analyzing means that frequency-analyzes the beat signal, each time the receiving means generates a beat signal, and generates a spectrum distribution in which the frequency included in the beat signal is associated with intensity of frequency components;
  generating means that generates a reflection intensity distribution in which the frequency is associated with road surface reflection intensity indicating a reflection intensity of the radar wave from a road surface at each frequency, on the basis of a plurality of spectrum distributions generated by the analyzing means over a prescribed number of measurement cycles prescribed in advance;
  detecting means that detects an intensity peak indicating a frequency that maximizes the road surface reflection intensity, in the reflection intensity distribution generated by the generating means; and
  deviation determining means that determines at least whether or not the radar apparatus is in an axis deviation state on the basis of the intensity peak detected by the detecting means, where the axis deviation state is taken to be a state where a reference axis of the radar apparatus has an inclination of not less than a prescribed angle in a vehicle height direction relative to a horizontal axis prescribed to the vehicle, wherein:
  the generating means includes
    frequency deriving means that calculates frequency of frequency intensity over the prescribed number of measurement cycles for each frequency in the spectrum distribution generated by the analyzing means, and derives an intensity frequency distribution indicating a correlation between the calculated frequency of a frequency intensity and the frequency intensity,
    specifying means that matches a road surface intensity distribution indicating a distribution of reflection intensity of the radar wave from the road surface against the intensity frequency distribution derived by the frequency deriving means while changing the frequency intensity, and as a result, specifies a frequency intensity having a highest correlation as a road surface reflection intensity at the frequency, for each of the intensity frequency distributions; and
    distribution generating means that generates the reflection intensity distribution by associating the road surface reflection intensity specified by the specifying means with each frequency.

2. The radar apparatus according to claim 1, wherein the road surface intensity distribution is a chi-square distribution.

3. The radar apparatus according to claim 1, wherein the deviation determining means specifies a deviation angle that is an angle of the reference axis relative to the horizontal axis.

4. The radar apparatus according to claim 3, wherein the deviation determining means specifies the deviation angle by matching the intensity peak detected by the detecting means against a deviation angle map indicating a correlation between an angle of the reference axis relative to the horizontal axis and the intensity peak.

5. The radar apparatus according to claim 3, wherein the apparatus comprises a driving means for driving the radar apparatus so that the deviation angle specified by the deviation determining means is less than the prescribed angle.

6. A radar apparatus that is mounted to a vehicle, the radar apparatus comprising:
  transmitting/receiving means that transmits a radar wave composed of an electromagnetic wave, and receives a reflected wave of the transmitted radar wave by a receiving antenna having vertical directivity in a vehicle height direction of the vehicle;
  target detecting means that detects a target that has reflected the radar wave, on the basis of the results of transmission/reception of a radar wave performed by the transmitting/receiving means; and
  deviation determining means that determines that the radar apparatus is in an axis deviation state in response to a minimum reflection intensity within a specific distance being not less than a reference reflection intensity, on the basis of the results of transmission/reception of a radar wave performed by the transmitting/receiving means, where the axis deviation state is taken to be a state where a reference axis has an inclination of not less than a prescribed angle relative to a horizontal axis extending from the receiving antenna, and the reference reflection intensity is taken to be a scattering intensity of a main beam of the radar wave from a road surface in a specific distance prescribed in advance from the receiving antenna in a non-axis deviation state, wherein:

the reference reflection intensity is prepared in advance as a reference intensity distribution that is a distribution of the scattering intensities in which the scattering intensities over the specific distance are arranged along a distance from the receiving antenna;

the transmitting/receiving means repeatedly performs transmission/reception of the radar wave along a progression of time; and the deviation determining means includes
distribution deriving means that derives a distribution of the reflection intensities in which minimum reflection intensities of reception intensities of the reflected waves repeatedly received by the transmitting/receiving means are arranged according to a distance from the receiving antenna, as the minimum reflection intensity, for each distance resolution over the specific distance, and
determining means that determines that the minimum reflection intensity is not less than the reference reflection intensity in response to a correlation value being not less than a prescribed threshold, as a result of matching the minimum reflection intensity derived by the distribution deriving means against the reference intensity distribution.

7. The radar apparatus according to claim 6, wherein:
the reference reflection intensity is prepared in advance as one reference intensity distribution;
the reference intensity distribution is prepared in advance for each inclination angle prescribed as an angle formed by the reference axis relative to the horizontal axis from the receiving antenna; and
the determining means matches the minimum reflection intensity against each reference intensity distribution, and as a result of the matching, specifies an inclination angle corresponding to a reference intensity distribution that maximizes a correlation value, as an inclination angle of the receiving antenna relative to the horizontal axis.

8. The radar apparatus according to claim 6, wherein:
the transmitting/receiving means transmits the radar wave that has been frequency-modulated so that the frequency decreases along the progression of time; and
the deviation determining means determines whether or not the radar apparatus is in the axis deviation state on the basis of a beat signal in which the reflected wave is mixed with the radar wave.

9. The radar apparatus according to claim 1, wherein the apparatus comprises notifying means that notifies occurrence of the axis deviation state in response to the deviation determining means determining the occurrence of the axis deviation state.

10. A computer-readable recording medium recorded thereon a program executable by a computer provided to a radar apparatus that is mounted to a vehicle, the radar apparatus including transmitting means that transmits a radar wave composed of continuous waves at a prescribed measurement cycle, and receiving means that receives a reflected wave of the radar wave transmitted by the transmitting means by a receiving antenna having vertical directivity, and mixing the received reflected wave with a radar wave transmitted by the transmitting means to generate a beat signal at each measurement cycle, the program enabling the computer to perform:

an analyzing procedure that frequency-analyzes the beat signal, each time the receiving means generates a beat signal, and generates a spectrum distribution where the frequency included in the beat signal is associated with intensity of frequency components;

a generating procedure that generates a reflection intensity distribution where the frequency is associated with road surface reflection intensity indicating a reflection intensity of a radar wave from a road surface at each frequency, on the basis of a plurality of spectrum distributions generated in the analyzing procedure over a prescribed number of measurement cycles prescribed in advance;

a detecting procedure that detects an intensity peak indicating a frequency that maximizes the road surface reflection intensity, in the reflection intensity distribution generated in the generating procedure; and a deviation determining procedure that determines at least whether or not the radar apparatus is in an axis deviation state on the basis of the intensity peak detected in the detecting procedure, where the axis deviation state is taken to be as a state where a reference axis of the radar apparatus has an inclination of not less than a prescribed angle in a vehicle height direction relative to a horizontal axis prescribed to the vehicle, wherein:

the generating procedure includes
a frequency deriving procedure that calculates frequency of frequency intensity over the prescribed number of measurement cycles for each frequency in the spectrum distribution generated in the analyzing procedure, and derives an intensity frequency distribution indicating a correlation between the calculated frequency of a frequency intensity and the frequency intensity,
a specifying procedure that matches a road surface intensity distribution indicating a distribution of reflection intensity of the radar wave from the road surface against the intensity frequency distribution derived in the frequency deriving procedure while changing the frequency intensity, and as a result, specifies a frequency intensity having a highest correlation as a road surface reflection intensity at the frequency, for each of the intensity frequency distributions; and
a distribution generating procedure that generates the reflection intensity distribution by associating the road surface reflection intensity specified in the specifying procedure with each frequency.

11. A computer-readable recording medium recorded thereon a program executable by a computer provided to a radar apparatus that is mounted to a vehicle and includes transmitting/receiving means that transmits a radar wave composed of an electromagnetic wave and receives a reflected wave of the transmitted radar wave by a receiving antenna having vertical directivity in a vehicle height direction of the vehicle, the program enabling the computer to perform:

a target detecting procedure that detects a target that has reflected the radar wave, on the basis of the results of transmission/reception of a radar wave performed by the transmitting/receiving means; and a deviation determining procedure that determines the radar apparatus is in an axis deviation state in response a minimum reflection intensity within a specific distance being not less than a reference reflection intensity, on the basis of the results of transmission/reception of a radar wave performed by the transmitting/receiving means, where the axis deviation state is taken to be as a state where a reference axis has an inclination of not less than a prescribed angle relative to a horizontal axis extending from the receiving antenna, and the reference reflection intensity is taken to be as a scattering intensity of a main beam of the radar wave from a road surface in a specific distance prescribed in advance from the receiving antenna in a non-axis deviation state, wherein:

the reference reflection intensity is prepared in advance as a reference intensity distribution that is a distribution of the scattering intensities in which the scattering intensities over the specific distance are arranged along a distance from the receiving antenna;

the transmitting/receiving means repeatedly performs transmission/reception of the radar wave along a progression of time; and the deviation determining procedure includes
   a distribution deriving procedure that derives a distribution of the reflection intensities in which minimum reflection intensities of reception intensities of the reflected waves repeatedly received by the transmitting/receiving means are arranged according to a distance from the receiving antenna, as the minimum reflection intensity, for each distance resolution over the specific distance, and
   a determining procedure that determines that the minimum reflection intensity is not less than the reference reflection intensity in response to a correlation value being not less than a prescribed threshold, as a result of matching the minimum reflection intensity derived in the distribution deriving procedure against the reference intensity distribution.

12. An axis deviation inspection method for a radar apparatus mounted to a vehicle, the method comprising:
   transmitting, by transmitting means, a radar wave composed of continuous waves at a prescribed measurement cycle;
   receiving, by receiving means, a reflected wave of a radar wave transmitted by the transmitting means by a receiving antenna having vertical directivity, and mixing the received reflected wave with a radar wave transmitted by the transmitting means to generate a beat signal at each measurement cycle;
   frequency-analyzing, by analyzing means, the beat signal, each time the receiving means generates a beat signal, and generating a spectrum distribution where the frequency included in the beat signal is associated with intensity of frequency components;
   generating, by generating means, a reflection intensity distribution where the frequency is associated with road surface reflection intensity indicating a reflection intensity of a radar wave from a road surface at each frequency, on the basis of a plurality of spectrum distributions generated by the analyzing means over a prescribed number of measurement cycles prescribed in advance;
   detecting, by detecting means, an intensity peak indicating a frequency that maximizes the road surface reflection intensity, in the reflection intensity distribution generated by the generating means; and
   determining, by deviation determining means, at least whether or not the radar apparatus is in an axis deviation state on the basis of an intensity peak detected by the detecting means, where the axis deviation state is taken to be as a state where a reference axis of the radar apparatus has an inclination of not less than a prescribed angle in a vehicle height direction relative to a horizontal axis prescribed to the vehicle, wherein:

the generating step includes
   calculating frequency of frequency intensity over the prescribed number of measurement cycles for each frequency in the generated spectrum distribution generated, and deriving an intensity frequency distribution indicating a correlation between the calculated frequency of a frequency intensity and the frequency intensity,
   matching a road surface intensity distribution indicating a distribution of reflection intensity of the radar wave from the road surface against the derived intensity frequency distribution while changing the frequency intensity, and as a result, specifying a frequency intensity having a highest correlation as a road surface reflection intensity at the frequency, for each of the intensity frequency distributions; and
   generating the reflection intensity distribution by associating the specified road surface reflection intensity with each frequency.

13. An axis deviation inspection method for a radar apparatus mounted to a vehicle, the method comprising:
   transmitting, by transmitting/receiving means, a radar wave composed of an electromagnetic wave and receiving, by the transmitting/receiving means, a reflected wave of the transmitted radar wave by a receiving antenna having vertical directivity in a vehicle height direction of the vehicle;
   detecting, by target detecting means, a target that has reflected the radar wave, on the basis of the results of transmission/reception of a radar wave performed by the transmitting/receiving means; and
   determining, by deviation determining means, the radar apparatus is in an axis deviation state in response to a minimum reflection intensity within a specific distance being not less than a reference reflection intensity, on the basis of the results of transmission/reception of a radar wave performed by the transmitting/receiving means, where the axis deviation state is taken to be as a state where a reference axis has an inclination of not less than a prescribed angle relative to a horizontal axis extending from the receiving antenna, and the reference reflection intensity is taken to be as a scattering intensity of a main beam of the radar wave from a road surface in a specific distance prescribed in advance from the receiving antenna in a non-axis deviation state, wherein:

the reference reflection intensity is prepared in advance as a reference intensity distribution that is a distribution of the scattering intensities in which the scattering intensities over the specific distance are arranged along a distance from the receiving antenna;

the transmitting/receiving means repeatedly performs transmission/reception of the radar wave along a progression of time; and the determining step includes
   deriving a distribution of the reflection intensities in which minimum reflection intensities of reception intensities of the reflected waves repeatedly received by the transmitting/receiving means are arranged according to a distance from the receiving antenna, as the minimum reflection intensity, for each distance resolution over the specific distance, and determining that the minimum reflection intensity is not less than the reference reflection intensity in response to a correlation value being not less than a prescribed threshold, as a result of matching the derived minimum reflection intensity against the reference intensity distribution.

\* \* \* \* \*